US011422868B2

(12) United States Patent
Rempel et al.

(10) Patent No.: US 11,422,868 B2
(45) Date of Patent: Aug. 23, 2022

(54) PRODUCT-AS-A-SERVICE FOR CONNECTED DEVICES

(71) Applicant: Exosite LLC, Minneapolis, MN (US)

(72) Inventors: Hans Aaron Rempel, Minneapolis, MN (US); Chris Rempel, Dillard, OR (US); Olof Jesper Lundgren, Hsinchu (TW); Renaud Marc Sauvain, Keelung (TW)

(73) Assignee: Exosite LLC, Minneapolis, MN (US)

( * ) Notice: Subject to any disclaimer, the term of this patent is extended or adjusted under 35 U.S.C. 154(b) by 55 days.

(21) Appl. No.: 16/550,202

(22) Filed: Aug. 24, 2019

(65) Prior Publication Data

US 2020/0089547 A1 Mar. 19, 2020

Related U.S. Application Data

(60) Provisional application No. 62/722,789, filed on Aug. 24, 2018.

(51) Int. Cl.
*G06F 9/54* (2006.01)
*G06K 7/10* (2006.01)
*G06K 7/14* (2006.01)

(52) U.S. Cl.
CPC .......... *G06F 9/54* (2013.01); *G06K 7/10297* (2013.01); *G06K 7/1413* (2013.01); *G06K 7/1417* (2013.01)

(58) Field of Classification Search
CPC .............................. G06F 9/54; G06K 7/10297
USPC ...................................................... 719/310
See application file for complete search history.

(56) References Cited

U.S. PATENT DOCUMENTS

| 6,751,207 B1* | 6/2004 | Lee ................... H04L 29/06027 370/338 |
| 2008/0031235 A1* | 2/2008 | Harris ................... H04L 69/163 370/389 |
| 2013/0186956 A1* | 7/2013 | Ashok .................. G06K 7/1417 235/385 |

(Continued)

OTHER PUBLICATIONS

Schwieren, Joachim, ID-Services: an RFID middleware architecture for mobile applications (Year: 2009).*

(Continued)

*Primary Examiner* — Lechi Truong
(74) *Attorney, Agent, or Firm* — Merchant & Gould P.C.

(57) ABSTRACT

Methods and systems for a product-as-a-service. One aspect includes a product-as-a-service system comprising a server computing device. The server computing device stores information associated with a connected device, the information including at least a claim code, and upon receipt of the claim code and an application identifier of an application to be associated with the connected device, associates the connected device with the application and facilitates interactions between the connected device and the application. The server computing device includes a server operating environment that provides one or more Internet of Things (IoT) services for interacting with the connected devices, and subscriber access to the one or more IoT services. The product-as-a-service system can be decoupled from the subscriber access to the one or more IoT services. The product-as-a-service system can be instantiated with a single action. The product-as-a-service system can also be instantiated using a structured template.

28 Claims, 22 Drawing Sheets

(56) References Cited

U.S. PATENT DOCUMENTS

| | | | | |
|---|---|---|---|---|
| 2014/0215312 A1* | 7/2014 | Hicks | .................... | G06F 16/95 |
| | | | | 715/235 |
| 2015/0141005 A1* | 5/2015 | Suryavanshi | ......... | H04W 48/16 |
| | | | | 455/434 |
| 2015/0347204 A1* | 12/2015 | Stanley-Marbell | ... | G06F 9/4893 |
| | | | | 719/318 |
| 2019/0035503 A1* | 1/2019 | Gonzalez | ............. | G06Q 10/103 |
| 2019/0097867 A1* | 3/2019 | Qiu | ........................ | H04L 63/10 |

OTHER PUBLICATIONS

Subhabrata Sen, Accurate, Scalable In-Network Identification of P2P Traffic Using Application Signatures. (Year: 2004).*

* cited by examiner

… (1)

PRODUCT-AS-A-SERVICE FOR CONNECTED DEVICES

CROSS REFERENCE TO RELATED APPLICATION

This application claims the benefit of U.S. Provisional Application No. 62/722,789, titled "Product-as-a-Service for Internet of Things Devices" and filed on Aug. 24, 2018, which is hereby incorporated by reference in its entirety.

INTRODUCTION

Using network connectivity to expose data and controls for a connected device (e.g., an Internet of Things (IoT) device) to an end user has unlocked value for vendors, such as durable goods manufacturers and operators. However, the current process to design, implement, and test connected product solutions is complex, brittle, and difficult to re-use. Current connected product solutions require both a connected device and a value-creating user interface (such as a software application). Although the vendor has developed distribution channels for their physical products, the actual installation and operation of the products are often conducted by other organizations focused on services or systems integration. Similarly, while the business intelligence value of digitized product information (e.g. product feature improvement, marketing optimization, cost efficiencies, adjacency strategic guidance, support desk) is well recognized by vendors, the systems and know-how surrounding extracting and utilizing the information in most organizations are not well developed. The vendors are well positioned to deploy a connected device, but are not well positioned to deploy connected device-driven user interfaces (end user applications or business intelligence/support systems). Therefore, the design, deployment, and operation of connected product solutions should inherently be decoupled between the connected device and the user interface(s).

SUMMARY

In general terms, this disclosure is directed to a product-as-a-service (PaaS) for connected devices.

One aspect is a server computing device for associating connected devices with applications comprising: at least one processing device; and at least one computer-readable storage device storing data instructions that, when executed by the at least one processing device, cause the at least one processing device to: store information associated with a connected device, the information including at least a claim code of the connected device; receive the claim code of the connected device; receive an application identifier of an application to be associated with the connected device; associate the connected device with the application; and facilitate interaction between the connected device and the application using the association.

Another aspect is a method for associating connected devices with applications comprising: storing information associated with a connected device, the information including at least a claim code of the connected device; receiving the claim code of the connected device; receiving an application identifier of an application to be associated with the connected device; associating the connected device with the application; and facilitating interaction between the connected device and the application using the association.

A further aspect is a product-as-a-service system (PaaS system) comprising: at least one server computing device, the at least one server computing device including a server operating environment that provides: one or more IoT services for interacting with connected devices; and subscriber access to the one or more IoT services, wherein the PaaS system is decoupled from the subscriber access to the one or more IoT services.

DETAILED DESCRIPTION

Figure 1:
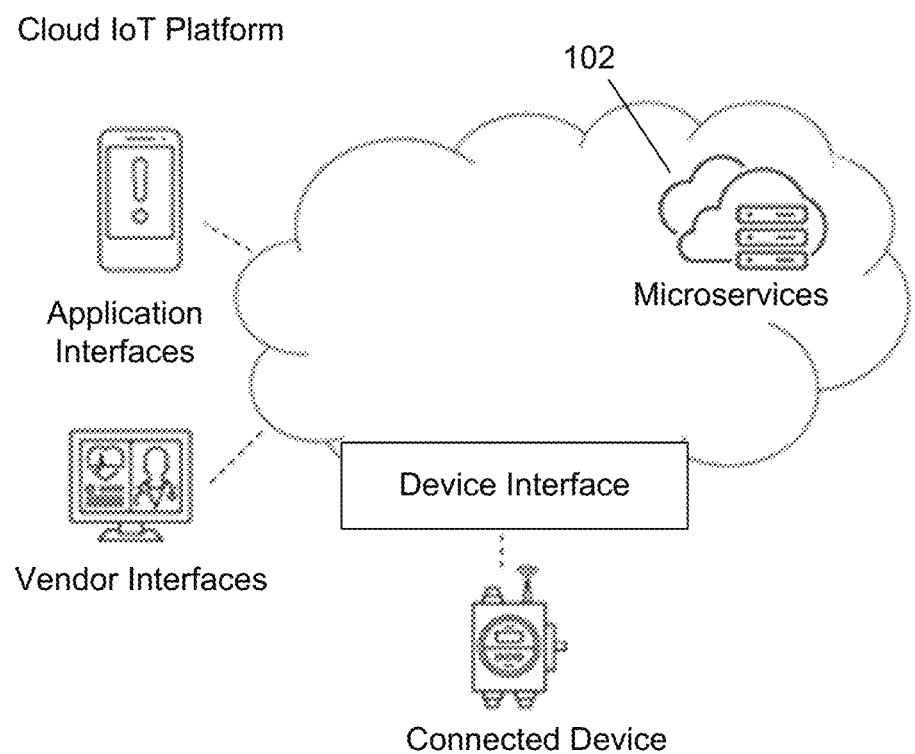
FIG. 1 is schematic block diagram of an example public cloud Internet of Things (IoT) platform.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The Product-As-A-Service System.

FIG. 1 is schematic block diagram of an example public cloud IoT platform. Today's most common connected product solution deployment topology is a public or private cloud environment containing primarily generic micro-services coupled with a device-facing interface. In the Public Cloud IoT Platform model, permission, data, and business rule design is required throughout the system to achieve the deployment of even a single connected product solution.

Figure 2:
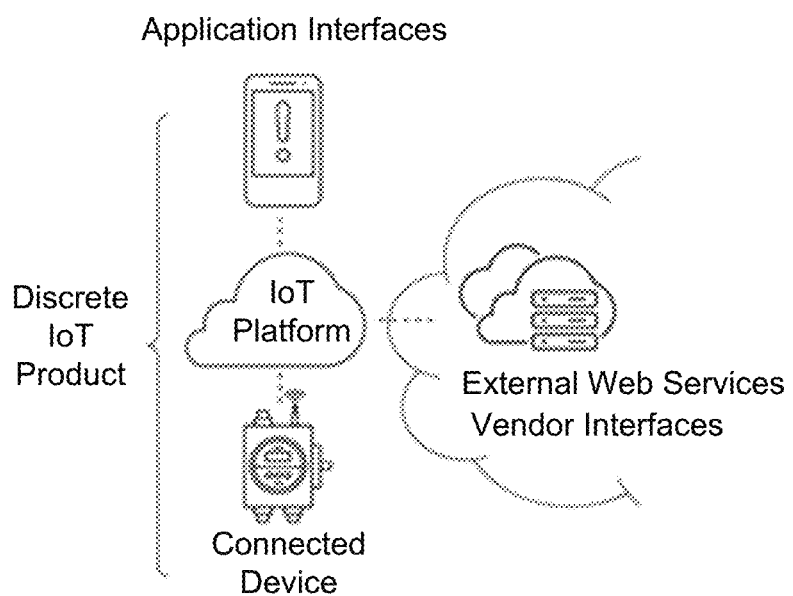
FIG. 2 is a schematic block diagram of an example discrete IoT product.
Figure 3:
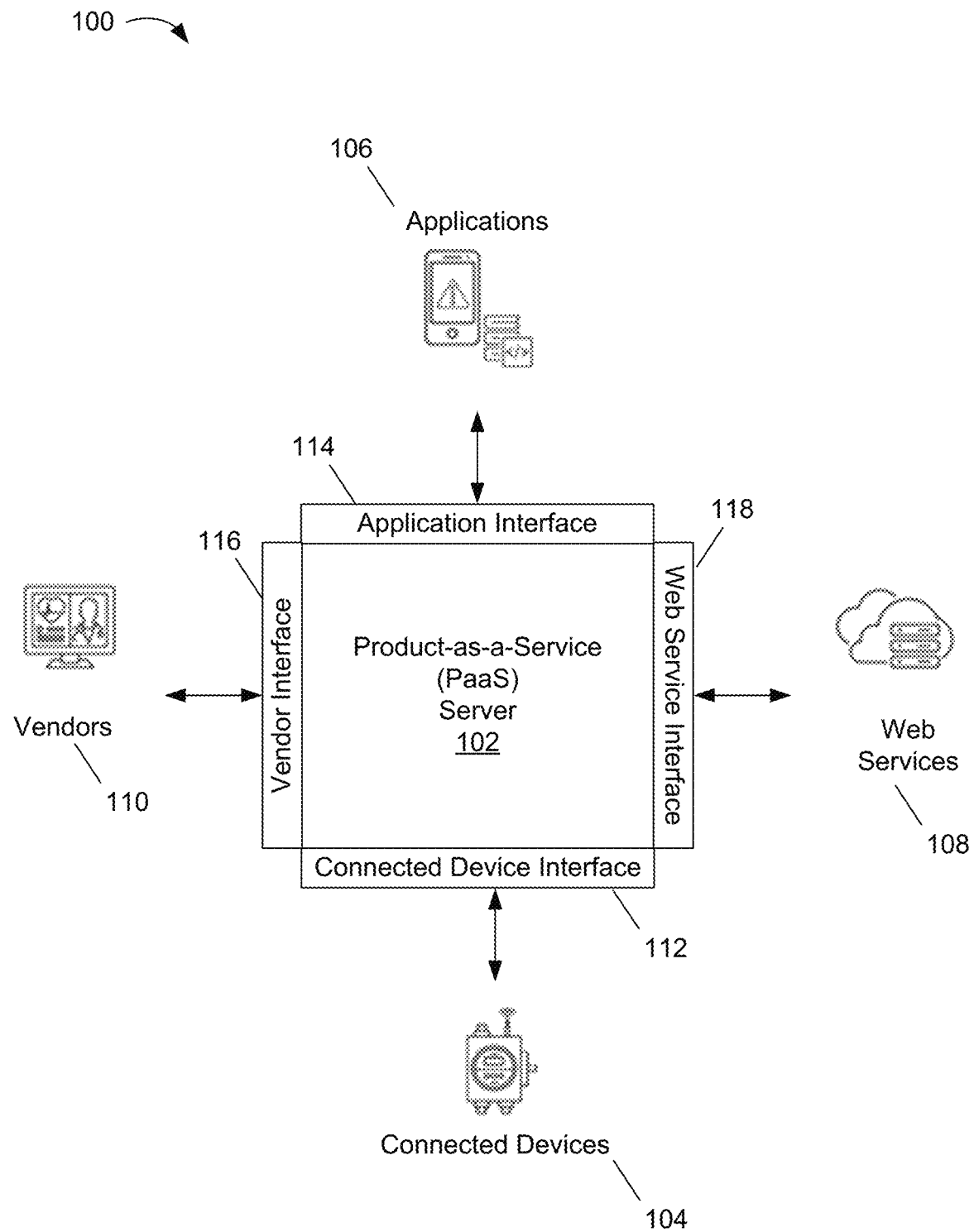
FIG. 3 is a schematic block diagram of an example product-as-a-service system (PaaS system).

FIG. 2 is a schematic block diagram of an example discrete IoT product, which is an example of a current connected product solution that demonstrates a step in the evolution between Public Cloud IoT Platform (FIG. 1) and product-as-a-service (FIG. 3). A Discrete IoT Product represents the minimum components required to create value as a connected product solution, but does not take the final step of decoupling the Product-as-a-Service from an Authorized User Application. The Discrete IoT Product approach requires that every connected product solution vendor manage details of the Authorized User Applications as well as details of the connected Devices.

FIG. 3 is a schematic block diagram of an example product-as-a-service system (PaaS system) 100. The PaaS system 100 introduces a complete server operating environment (e.g., PaaS Server 102) that is IoT product-centric (e.g., provides one or more connected device services (e.g., IoT services) for interacting with connected devices 104), and includes subscriber-optimized server capabilities (e.g., provides subscriber access to the one or more IoT services). The connected devices 104 can be smart products, among other example products. Subscribers can include applications 106 and/or external web services 108.

Products-as-a-service are instantiated and managed by vendors 110 of the connected devices 104 on behalf of providers of applications 106, referred to hereinafter as application providers, who would like to deploy user or business applications that interact with the connected devices 104, but who would not like to manage the intricacies of a connected device fleet. The vendors 110 can include original equipment manufacturers (OEMs), distributors, suppliers, wholesalers, and retail sellers, among other examples.

The PaaS system 100 includes a software architecture that decouples Southbound, Northbound, Westbound, and Eastbound contexts, and also allows those contexts to be combined and recombined together via product-as-a-service template instantiations or through dynamic configurations by vendors 110 on behalf of application providers.

In some embodiments the Southbound, Northbound, Westbound, and Eastbound contexts are interfaces. For example, the Southbound interface can be a connected device interface 112, the Northbound interface can be an application interface 114, the Westbound interface can be a vendor interface 116, and the eastbound interface can be a web service interface 118. In some embodiments, the interfaces are Application Programming Interfaces (APIs).

Specifically, at least some embodiments according to the present disclosure include one or more of the following architectural attributes:

(i) A micro-services architecture where Southbound interfaces (one or more micro-services), Northbound interfaces (one or more micro-services), Eastbound integrations (zero or more micro-services), and Westbound integrations (several micro-services) are treated as decoupled units that each function and scale and can be instantiated and managed independently. However, the micro-services architecture is not required, and other service architectures can be used in other embodiments.

(ii) A central message bus and/or service broker as well as a Complex Event Processor that combines contexts from one or more services or micro-services together into a single PaaS System 100. The central message bus and/or service broker leverages the Complex Event Processor to automate the instantiation and behavior of a given system and allow dynamic configuration of that system by a vendor.

(iii) A data storage layer that allows the central message bus and/or service broker to store configuration data about the PaaS system 100 as well as data and configurations for the connected devices 104.

(iv) For the Southbound interface (e.g., the connected device interface 112), a device management system that allows configuration, authentication, firmware updates, and interfaces for facilitating the flow of data from the connected devices 104 into the product-as-a-service context.

(v) Exchange (a role-based access control system) for publishing the PaaS system 100 or template for viewing and/or use by other users or for public consumption by non-authenticated users. The role-based access control system may be utilized for managing subscriber access to the PaaS system 100 and for instantiating and managing new PaaS systems on behalf of the vendors 110 for use by the applications 106.

Services and Configurations.

Figure 4:
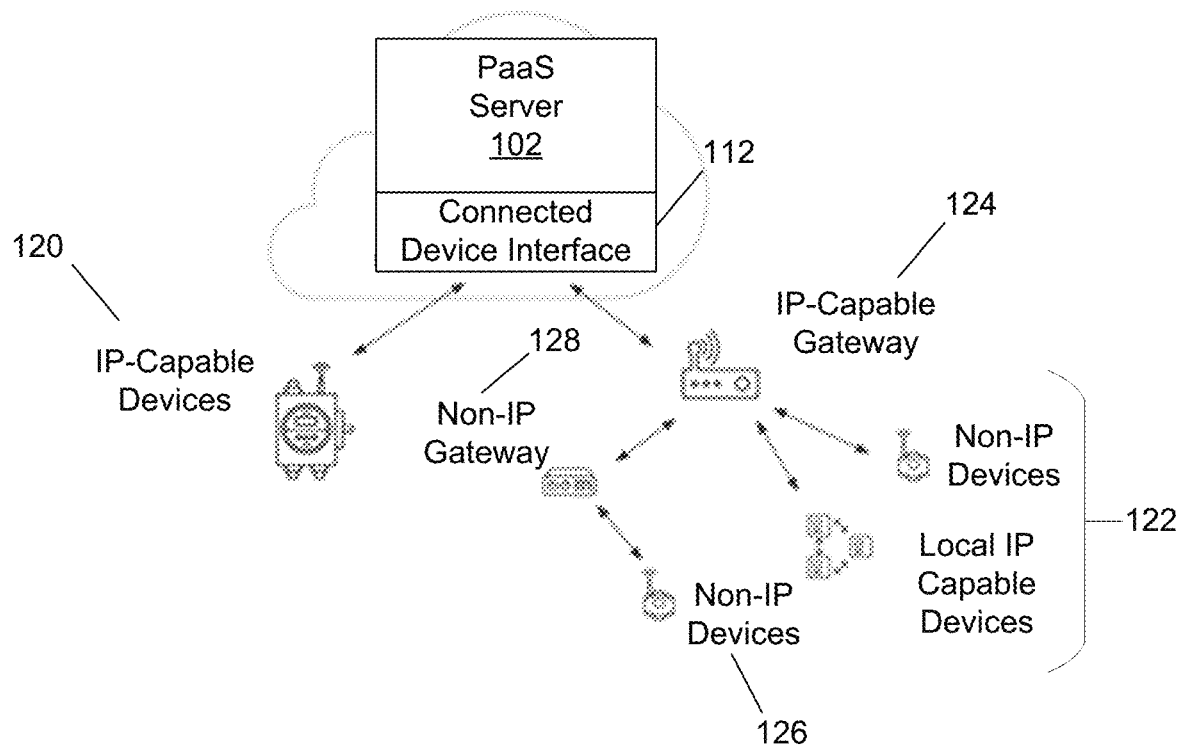
FIG. 4 is a schematic block diagram illustrating example connected device configurations.

FIG. 4 is a schematic block diagram illustrating example connected device configurations. A product-as-a-service is IoT product-centric. It encapsulates services available to a server environment (e.g., PaaS server 102) that can enhance the perceived or actual feature set of devices that are managed by the product-as-a-service context. In some embodiments, the connected devices 104 that are managed by the product-as-a-service context include one or more of the following configurations:

(i) IP capable devices 120 that communicate with the Internet over one or more IP-based protocols.

(ii) Non-IP devices or local IP capable devices (e.g., devices 122) communicatively coupled to an IP capable gateway 124, which communicates over an IP protocol on behalf of the devices 122.

(iii) Non-IP devices 126 communicatively coupled to a non-IP gateway 128 that is further coupled to the IP capable gateway 124, which ultimately communicates over an IP protocol on behalf of the Non-IP devices 126.

In some embodiments, all connected device communications with a product-as-a-service context require unique, per-device, credentials that are validated directly or indirectly by the product-as-a-service context. These credentials can be established real time, whitelisted with the product-as-a-service beforehand, or implement cryptographic methods that allow third-party validation.

Figure 5:
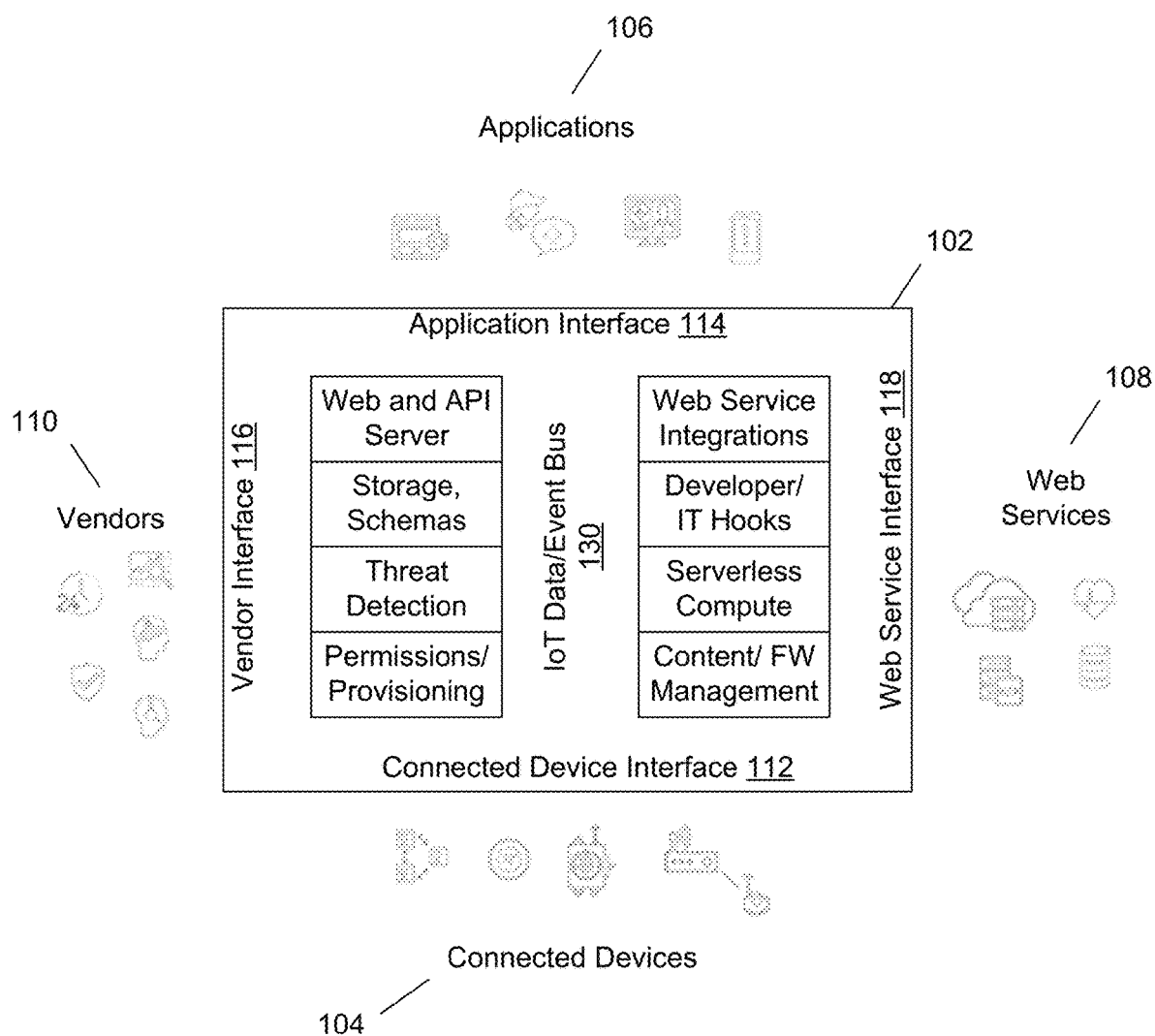
FIG. 5 is a schematic block diagram illustrating example product-as-a-service services.

FIG. 5 is a schematic block diagram illustrating example product-as-a-service services. In some embodiments, services included within a product-as-a-service are organized around a permission-managed central IoT Data & Event Bus context 130 as described with respect to the PaaS system 100 discussed in the section above, and can include one or more of the following:

Device communications APIs
    Device authentication and provisioning
    Device event notification system
    Device firmware, content, and/or information storage
    Device firmware or content remote update processes Device data schema configuration—data which may or may not be primarily controlled by device activity or by other related activity (Server capability initiated, User initiated, Web service initiated)

Time stamped storage of device communication as raw data and/or per the established data schema Access (publish and/or subscribe) to external web services Algorithms, filters, rules, health measurements, predictors, and transformations that augment devices with new data, events, and behavior that provide additional value Server processing/serverless compute Access by the server processing environment to configured external web services Storage of web application files Application credential validation and provisioning Application communications APIs Device, User, and Web Service anomaly/threat detection Administrative User Interfaces and functions for configuring product-as-a-service services Developer interfaces and functions for developing product-as-a-service services Southbound Interface.

Figure 6:
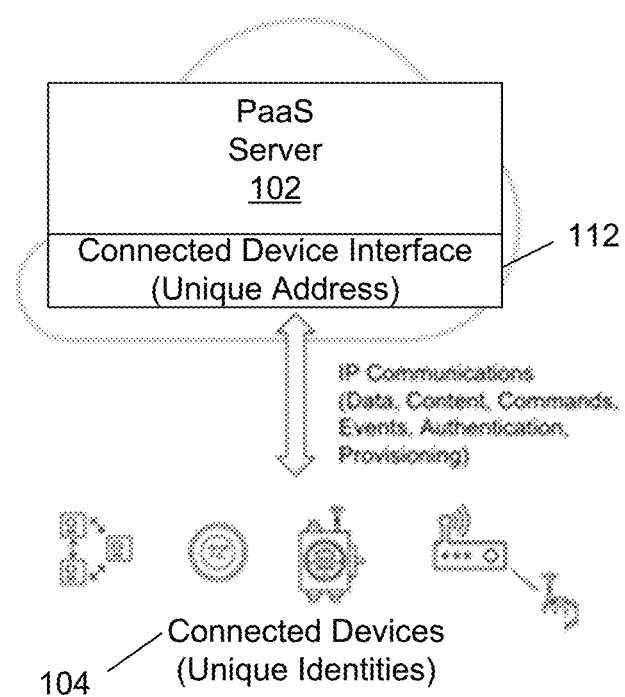
FIG. 6 is a schematic block diagram illustrating an example connected device interface.

FIG. 6 is a schematic block diagram illustrating an example connected device interface 112. The Southbound or connected device interface 112 of the PaaS server 102 interacts with the connected devices 104. Device communications include bidirectional data and events, and interactions having to do with device authentication. In some embodiments, every communication of the connected device interface 112 is either uniquely authenticated to a device identity, or is part of a process to establish an authenticated device identity. Communications are transacted over an IP-based protocol, such as MQTT or HTTP, and may encapsulate other IP or non-IP based protocols for distribution by the connected devices 104 acting as gateway systems. All Southbound communications use a single unique server address associated with the PaaS server 102.

The connected device interface 112 is configured by a vendor with respect to, one or more of, for example, protocol selection, authentication method, and identity criteria. The connected device interface 112 can be further choreographed via product-as-a-service services to automatically store, publish, or subscribe-to data and events. These automatic actions can be further scripted to interact with threat detection and other web services (e.g., the external web services 108) that provide value to the implementation of product-as-a-service.

Northbound Interface.

Figure 7:
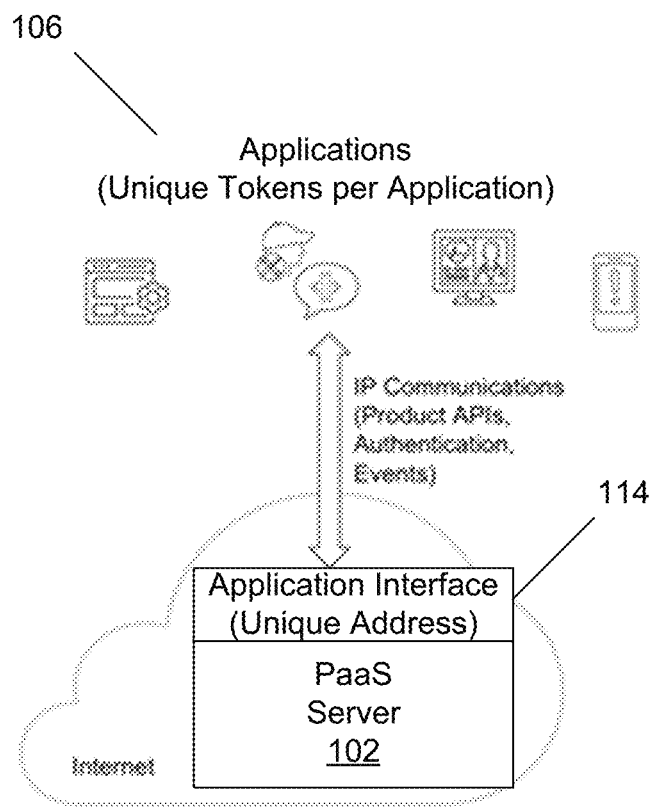
FIG. 7 is a schematic block diagram illustrating an example application interface.

FIG. 7 is a schematic block diagram illustrating an example application interface 114. The Northbound or application interface 114 of the PaaS server 102 interacts with the applications 106. Application communications include bi-directional data and events, and interactions having to do with application authentication. In some embodiments, every communication of the application interface 114 is uniquely authenticated to an application from the applications 106, is part of a process to establish application authentication, or is part of a public-facing interface that does not require authentication. Communications are transacted over an IP-based protocol, such as Websockets or HTTP, for communication with the applications 106 that have been authenticated. All Northbound communications use a single unique server address associated with the PaaS server 102.

The application interface 114 is configured by a vendor. The application interface 114 has a default API that allows application registration, device claim-of-ownership by an application, and other device and application related workflows. A default web page is also hosted by the application interface 114 at the unique address, allowing the registration of a user (who is responsible for an authenticated application), and the initiation of one or more authentication tokens by the user for use with the application.

Types of the applications 106 include, but are not limited to, the following:

User-facing web application, such as an Industrial Dashboarding system

User-facing mobile application, such as a Home Automation mobile application for phones or tablets Business information systems Analytics applications Data warehouses Aggregation and automation applications Enterprise asset performance management systems Computer-aided design (CAD) systems Asset building applications that assemble multiple products into a conglomerate asset Other product-as-a-services (Northbound Interface to Eastbound Interface—see description and figure below)

In some embodiments, product-as-a-service includes auto-generated documentation that describes the Northbound Application Programming Interface (API) so that application providers know how to interact with product-as-a-service implementations. A sample of API calls by which the applications 106 can interact with the PaaS server 102 via the northbound or application interface 114 to facilitate association and interaction between the connected devices 104 and the applications 106, for example, are included in Table 1 below.

TABLE 1

Example API calls

| API call | Function performed by API call |
| --- | --- |
| POST /interface/v1/register | Register application using the temporary app token. This endpoint will return a access-key and a secret key that can be used to authenticate incoming events and sign request to other APIs |
| POST /interface/v1/getIdentity | Get device information |
| POST /interface/v1/getIdentityState | Get device state |
| POST /interface/v1/claim | Claim devices using a claim token |
| POST /interface/v1/get TempClaimURL | Generate temporary session for application users to claim devices to their group using the PaaS application user interface |
| POST /interface/v1/listIdentities | List devices |
| POST /interface/v1/setIdentityState | Set device data |
| POST /interface/v1/getContext | Get application context for a device |
| POST /interface/v1/setContext | Set application context for a device |

Eastbound Interface.

Figure 8:
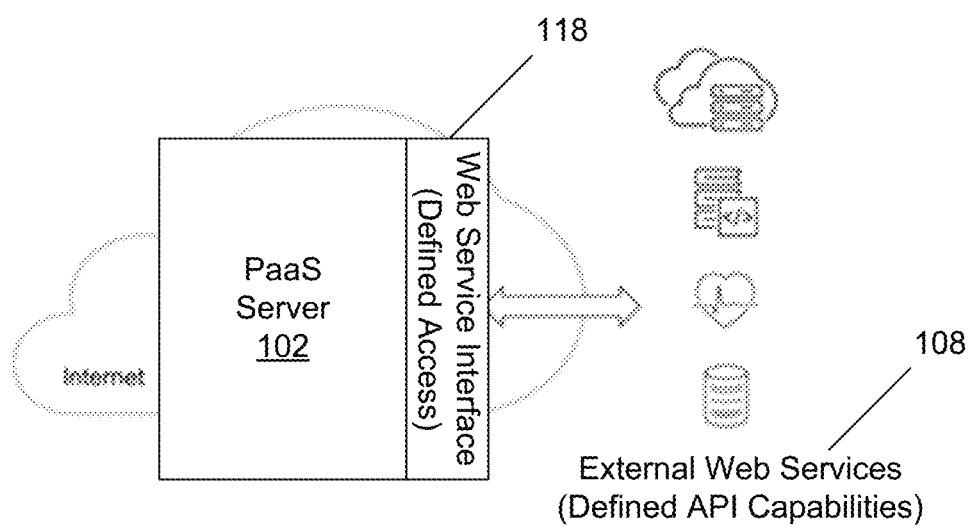
FIG. 8 is a schematic block diagram illustrating an example web service interface.

FIG. 8 is a schematic block diagram illustrating an example web service interface 118. The Eastbound or web service interface 118 of PaaS Server 102 interacts with the external web services 108.

The external web services 108 are used to augment product-as-a-service services either by providing additional functionality to the product-as-a-service processing environment, or by being activated/triggered by activity in the product-as-a-service environment. The external web services 108 are authorized by loading API definitions, and sometimes authentication tokens/credentials, into the product-as-a-service configuration.

An example of services augmentation is a web service that provides environmental weather data. The PaaS server 102 could query the weather data to retrieve weather information about its geolocation. This weather information could be stored as part of a device's characteristics, or could be used to make further decisions about the health of a device.

An example of services augmentation is a web service that provides for the transaction and management of cellular or other communications-as-a-service data and information streams.

An example of services augmentation is with one or more other application interfaces that provide product data, event, and management services which can be further embellished with other web services, such as weather information, and then re-published as a new product-as-a-service that is an augmented version of the original one(s).

An example of augmentation is a web service that provides historical time-based maintenance records for a physical product. When combined with real-time data from the device in the field, it is possible to achieve a rich condition-based maintenance program that is a combination of IoT data as well as historical manual inspections and performance data.

Figure 9:
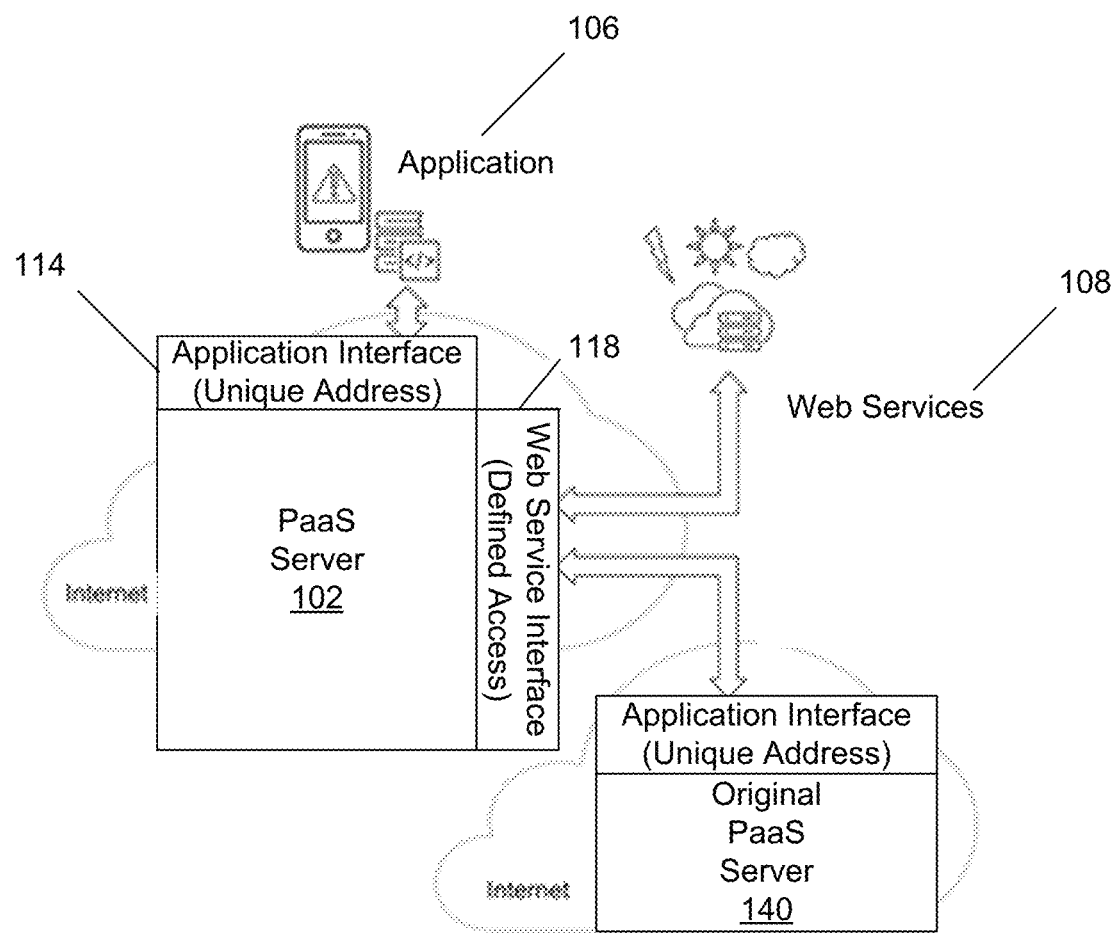
FIG. 9 is a schematic block diagram illustrating an example product-as-a-service republication with embellishments.

FIG. 9 is a schematic block diagram illustrating an example product-as-a-service republication with embellishments.

Application interfaces that provide product data, event, and management services can be embellished with the web services 108, such as weather information, and then re-published as a new product-as-a-service that is an augmented version of the original one(s). For example PaaS server 102 can be embellished with web services 108 and then be re-published as an augmented version of original PaaS server 140.

An example of a web service that can be triggered based on product-as-a-service health is a workflow management system for field technicians. If the health of a product-as-a-service reaches a level that warrants maintenance, the workflow management system can be notified via the external web services 108.

The methods by which the product-as-a-service may interact with external web services 108 is based on a definition of the external web service's API services (e.g., based on web service interface 118).

Westbound Interface.

Figure 10:
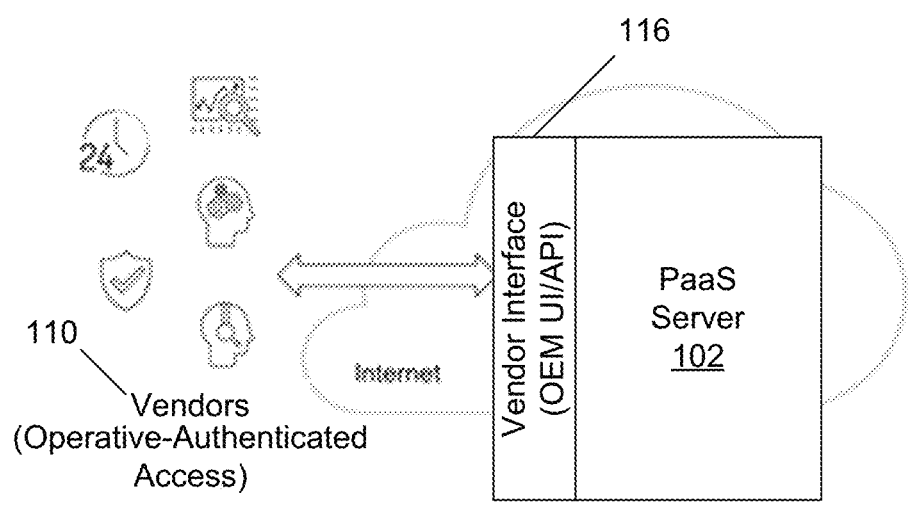
FIG. 10 is a schematic block diagram illustrating an example vendor interface.

FIG. 10 is a schematic block diagram illustrating an example vendor interface 116. The Westbound or vendor interface 116 of the PaaS server 102 provides a range of vendor features.

These vendor features are used by the vendors 110 to develop, deploy, and manage one or more products-as-a-service. The vendors 110 gain access to these features through a product-as-a-service authentication user interface where team members (Operatives) can be invited, credentials established, and permissions managed.

Figure 11:
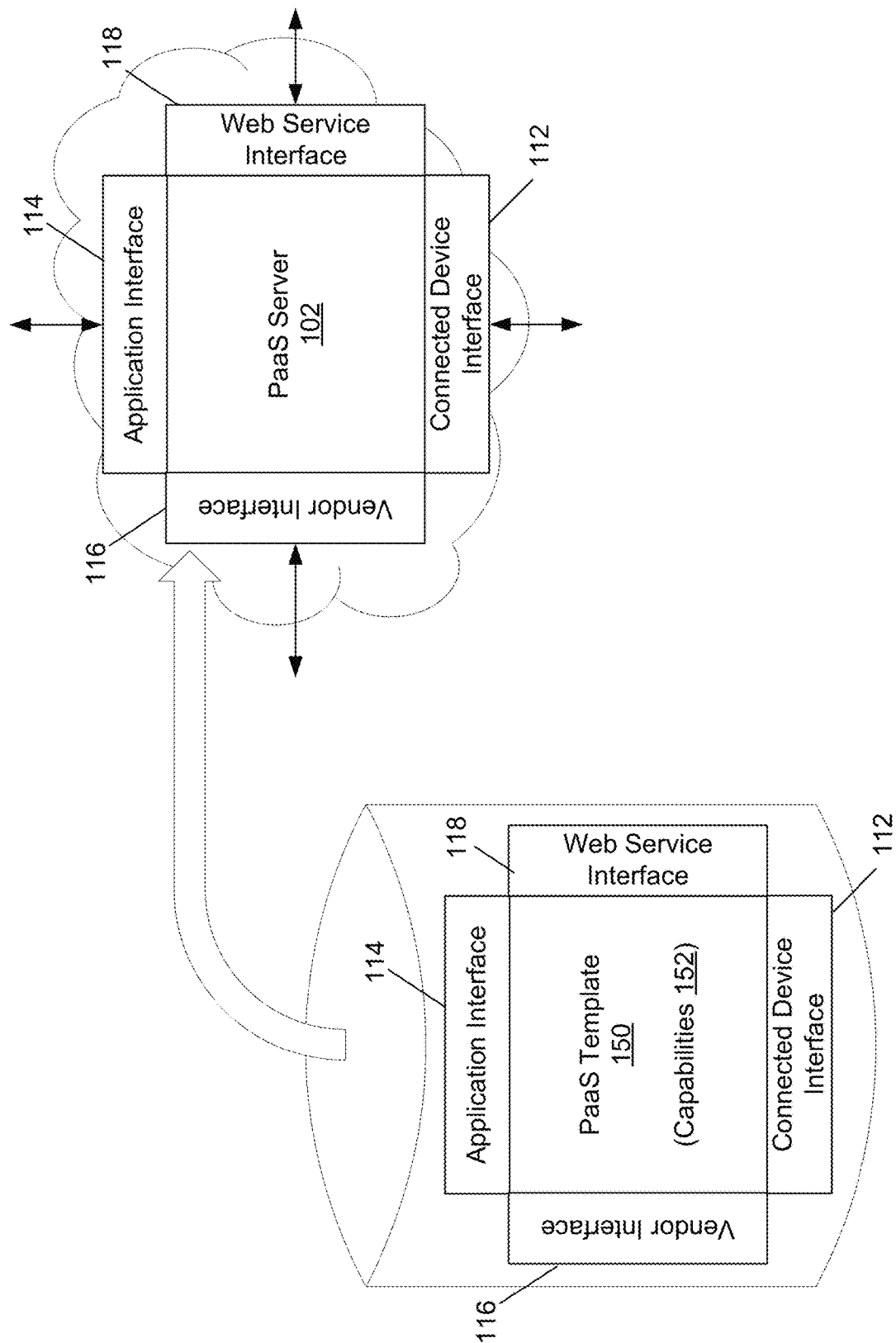
FIG. 11 is a schematic block diagram illustrating an example single-action instantiation and activation of a product-as-a-service.

Examples of the vendor features include, but are not limited to, the following:

Logging user interface and logging server interface to log interactions over the product-as-a-service interfaces for audit, compliance, and forensic purposes Configuration user interface and APIs to support the setup, configuration, and modification of product-as-a-service services and interfaces Publication user interface and APIs to support the publication of the product-as-a-service information for discovery and use by application providers Continuous integration and continuous development tools & interfaces to support the development and configuration and deployment of software and settings represented by the product-as-a-service services Support tools & interfaces to provide a support team the necessary discovery, debug, and remedial methods in support of deployed products-as-a-service Manufacturing interfaces, tools, and endpoints for functional test to support the production test, credential management, and whitelisting processes during manufacturing time Data visualization and manipulation tools and interfaces to support backup, upload, download, analytics, and other data-driven interests by the Operatives Instantiation and Publication FIG. 11 is a schematic block diagram illustrating an example single-action instantiation and activation of a product-as-a-service. A fully working product-as-a-service such as the PaaS system 100 can be instantiated by a vendor (e.g., one of vendors 110) from a structured template 150 with a single action. This action instantiates and activates capabilities 152 and the Northbound, Southbound, Eastbound, and Westbound Interfaces (e.g., the application interface 114, the connected device interface 112, the web service interface 118, and the vendor interface 116, respectively) for the PaaS server 102. As discussed above, although not required, some of these interfaces are subsequently customizable by the vendor.

Once instantiated, the vendor may choose to publish the product-as-a-service into a publicly accessible catalog that allows searchable and browsable discovery of the product-as-a-service and, for server systems that support the application interface 114, automatic integration of the related services into the operating environment of an authenticated application (e.g., one of the applications 106 that has been authenticated). This publication can be configured and executed by filling in and submitting a web form.

Post Instantiation Phases of PaaS System.

Figure 12:
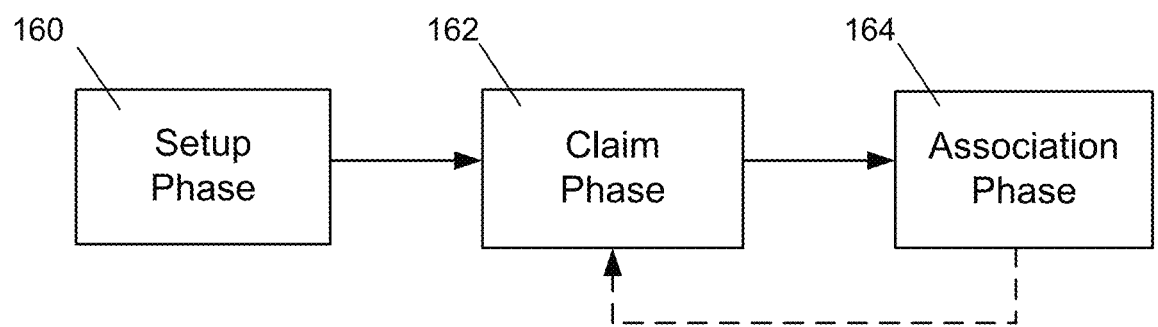
FIG. 12 is a schematic block diagram illustrating example post instantiation phases of a PaaS system.

FIG. 12 is a schematic block diagram illustrating example post instantiation phases of the PaaS system 100. After instantiation by the vendor as described above with respect to FIG. 11, the PaaS system 100 can undergo a sequence of phases including a setup phase 160, a claim phase 162, and an association phase 164 in order to associate and facilitate interactions between the applications 106 and the connected devices 104.

In the setup phase 160, claim codes are generated and associated with connected devices 104. The claim codes are random character codes, for example, that can be used to prove ownership of the connected devices 104. In some examples, the vendors 110 generate and associate the claim codes with the connected devices 104 and provide the claim codes to the PaaS server 102, along with other information of the connected devices 104. In other examples, PaaS server 102 can automatically generate the claim codes in response to the vendors 110 providing approval or selecting to generate the claim codes (e.g., the approval or selection received via the vendor interface 116). In further examples, the connected devices 104 can generate and provide the claim codes to the PaaS server 102. The claim codes are unique for each of the connected devices 104 of a same type.

In other words, no two connected devices of a same type (e.g., a same product of the vendor) will have a same claim code.

In the claim phase 162, the PaaS server 102 receives the claim code of one of the connected devices 104. The receipt of the claim code triggers or otherwise initiates a claiming process (e.g., a process by which an owner claims, establishes, or otherwise sets ownership of the connected device). Different implementations of the claiming process are described in detail with respect to FIGS. 16-20. During the claim phase 162, a group identifier can be established for the connected device.

In the association phase 164, the PaaS server 102 receives an application identifier of one of the applications 106 to be associated with the connected device. The connected device and the application are then associated, and the PaaS server 102 facilitates interaction between the connected device and the application using the association. For example, data or other communications can be routed between the connected device and the application via the PaaS server 102. The group identifier previously mentioned provides an application or pairing context that allows the connected device to be able to modify the existing association, as well as associate or pair with one or more other applications and subsequently manage those associations during the association phase 164.

In some embodiments, the claim phase 162 and the association phase 164 can overlap in time and/or can occur nearly simultaneously depending on a type of claiming process performed. In one example, the association phase 164 may begin before the claim phase 162 has completed. In another example, the claim code and application identifier can be received at the same time causing the claim phase 162 and association phase 164 to begin nearly simultaneously.

In further embodiments, the association phase 164 reverts back to the claim phase 162 when the ownership of the connected device is reset. For example, when the ownership of the connected device is reset, all existing associations between the connected device and applications are removed. One way in which the connected device can be reset is by removing the group identifier. Ownership of the connected device can also be reset using other methods.

In some embodiments, the connected device can be claimed once, and only once. While ownership is claimed, no one else can use a claim code to claim the connected device. Subsequent claims can only occur if the connected device has its claim of ownership reset. Accordingly, the connected device can only have a single claim of ownership. (An example of this is shown in the example data structures of FIG. 22, where the device ownership data structure 356 identifies the owner (owner ID) of the connected device, which is associated to the connected device (identity ID) by the group ID.)

In some embodiments a single claim of ownership of the connected device may be associated with a plurality of users. For example, depending on the system implementation, many users may be able to administrate the single claim of ownership after the claim has occurred, such as by claiming into a group, in which multiple users are added to the group. Further, this single claim of ownership involving a plurality of users can be reset by releasing the group ID.

The owner can claim, view, and manage the connected device and one or more applications belonging to a group (e.g., associated with the same group identifier) through a PaaS application rendered on a computing device of the owner (e.g., owner computing device) or the application itself depending on functionalities of the application. For example, if the application is a simpler application that does not have its own management user interface to work with the PaaS server 102 (e.g., an application with a single serverless function), the owner can claim and manage devices using the PaaS application. Alternatively, if the application is a fully featured application that manages its own users and user interface, the application can create a group on an instance of the PaaS server 102, and claiming and management of the connected device can be provided via the user interface of the application itself, enabling a fully integrated experience to the owner.

To provide an example, the connected device may be a smart wall outlet plug. During the setup phase 160, the smart wall outlet plug can be associated with a claim code generated by one of a vendor of the smart wall outlet plug, the PaaS server 102, or the wall outlet plug that is provided to/stored by the PaaS server 102. An owner of the smart wall outlet plug can initiate a claiming process (e.g., via the PaaS application or the application to be associated with the smart wall outlet plug itself such as an energy control application) by providing the claim code of the smart wall outlet plug to PaaS server 102 to establish ownership of the smart wall outlet plug during claim phase 162. Once the claim code of the smart wall outlet plug is received along with an application identifier of the energy control application, the PaaS server 102 associates the smart wall outlet plug with the energy control application during the association phase 164. Additionally, during the association phase 164, the PaaS server 102 facilitates data flow between the smart wall outlet plug and the energy control application. For example, the PaaS server 102 can route commands (e.g., to turn on or off devices plugged into the smart wall outlet plug) from the energy control application to the smart wall outlet plug or can route data collected by the smart wall outlet plug (e.g., number and types of devices plugged into the smart wall outlet plug and associated data consumption over time) to the energy control application.

Figure 13:
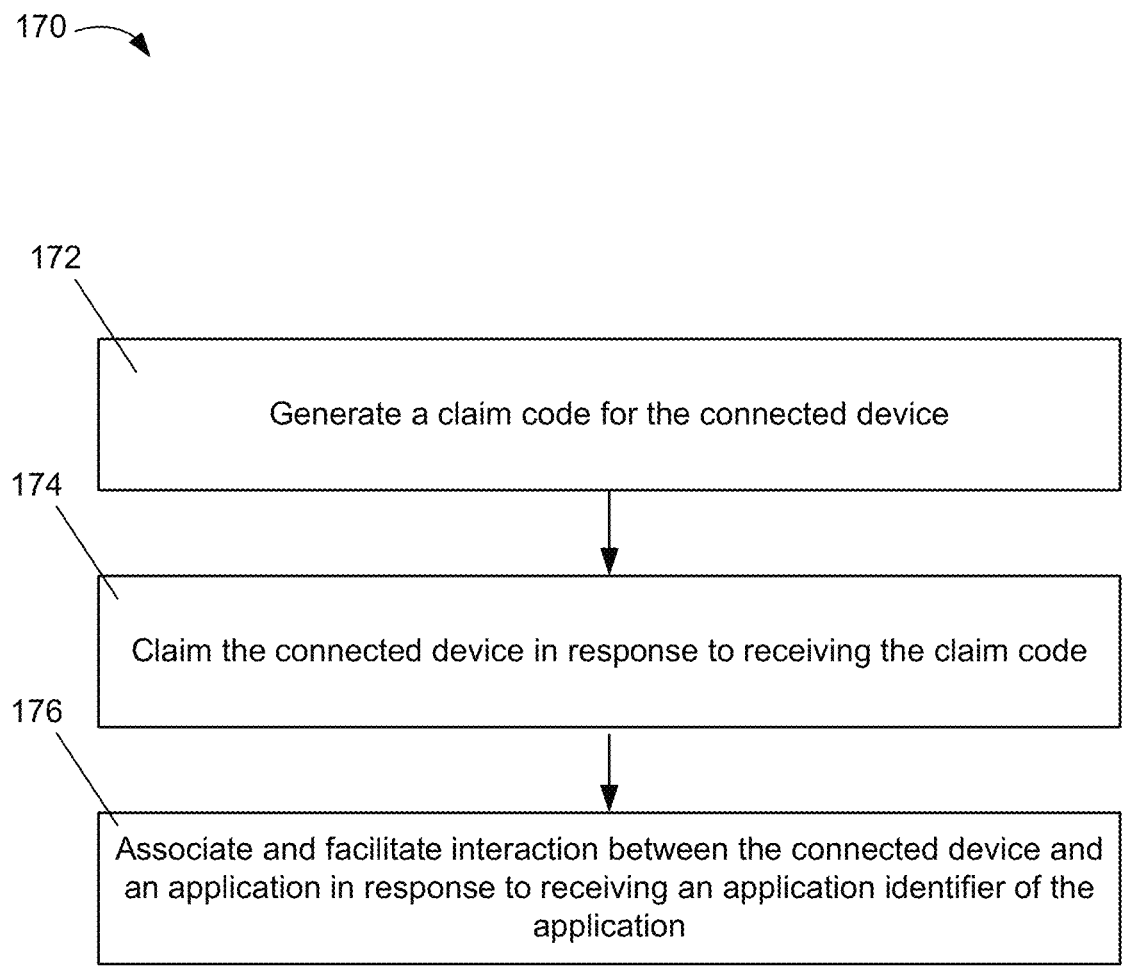
FIG. 13 illustrates an example method for claiming connected devices to further associate and facilitate interactions between the connected devices and applications.

FIG. 13 illustrates an example method 170 for claiming connected devices 104 to further associate and facilitate interactions between the connected devices 104 and the applications 106. In this example, the method 170 is described as being performed by one or more of a vendor, the PaaS server 102, and a connected device.

Method 170 may begin at operation 172, where a claim code is generated for one of the connected devices 104. In some examples, the vendor generates and provides the claim code to the PaaS server 102 for storage, along with other information of the connected device. In other examples, PaaS server 102 can automatically generate and store the claim code (e.g., in response to the vendor providing approval or selecting to generate the claim code via the vendor interface 116). In further examples, the connected device can generate the claim code and provide to the PaaS server 102 for storage.

At operation 174, the connected device is claimed in response to receiving the claim code. In some embodiments, the PaaS server 102 receives the claim code from a PaaS application being rendered on a computing device (e.g., an owner computing device). In other embodiments, the PaaS server 102 receives the claim code from the application to be associated with the connected device that is executing on the owner computing device.

At operation 176, the connected device is associated with an application (e.g., from one of the applications 106) in response to receiving an application identifier of the application. In some embodiments, the PaaS server 102 receives the application identifier from a PaaS application being rendered on the owner computing device. In other embodiments, the PaaS server 102 receives the application identifier from the application that is executing on the owner computing device.

Additionally, at operation 176, interaction is facilitated between the connected device and the application using the association. For example, as described in greater detail with respect to FIGS. 18-19, PaaS server 102 routes data between the connected device and the application based on the association. In some examples, the association is stored within a data structure that is referenced upon receiving data from one of the connected device or the application to be provided to the other of the connected device or the application.

Setup Phase.

Figure 14:
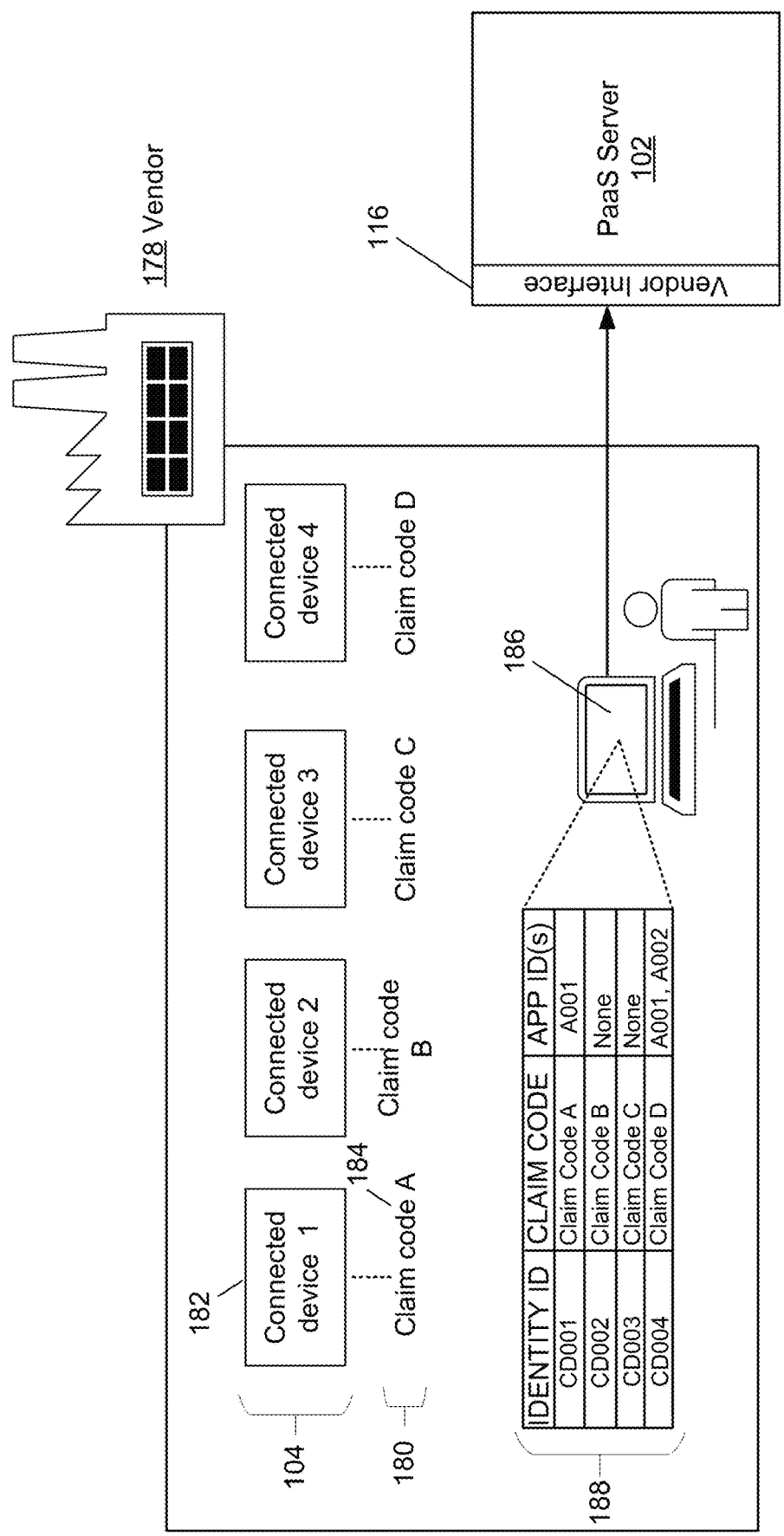
FIG. 14 is a conceptual diagram illustrating a setup phase of a PaaS system.

FIG. 14 is a conceptual diagram illustrating an example setup phase 160 of the PaaS system 100. As illustrated, a vendor 178 (e.g., from vendors 110) is a manufacturer of the connected devices 104. In other examples, the vendor 178 may be a distributor, a supplier, a wholesaler, or retail sellers, among other similar entities.

Upon manufacturing the connected devices 104, the vendor 178 associates claim codes 180 with the connected devices 104. The claim codes 180 are random character codes that can be used to prove ownership of the connected devices 104. The claim codes 180 are unique for each of the connected devices 104 of a same type. In other words, no two connected devices of a same type (e.g., a same product of the vendor) will have a same claim code. As one example, a connected device 182 from the connected devices 104 is associated with a claim code 184. In some examples, the vendor 178 generates the claim codes 180. In other examples, the vendor 178 receives the claim codes 180 generated by the PaaS server 102, where the PaaS server 102 generates the claim codes 180 in response to the vendor 178 selecting or approving the generation. In further examples, the connected devices 104 generate the claim codes 180.

In some embodiments, the vendor 178 can associate the claim codes 180 with the connected devices 104 by marking the connected devices 104, a packaging of the connected devices 104, or instructions included within the packaging of the connected devices 104 with the claim codes 180. In other embodiments, the vendor 178 can print the claim codes 180 on a sticker or other similar adhesive for placement on the connected devices 104, the packaging of the connected devices 104, or the instructions included within the packaging of the connected devices 104. In some examples, the claim codes 180 are in a form of machine-readable codes, such as barcodes, QR codes, or Radio-frequency Identification (RFID) codes. In other examples, the claim codes 180 are in a form of a "bump" profile, a Near Field Communication (NFC) or Bluetooth provided piece of information, a serial-port or Universal Serial Bus (USB) local communication, or other digitally supplied mechanism.

The vendor 178 can utilize a vendor computing device 186 to subsequently collect and store information associated with each of the connected devices 104 within a data structure, such as a table 188. The information includes identity identifiers of the connected devices 104 and the respective claim codes 180. The vendor 178 can also optionally collect application identifiers of applications capable of being associated with the connected devices 104. For example, providers of the applications may provide the application identifiers to the vendor 178, and in some examples, the vendor 178 is an application provider. The information from the table 188 is transmitted from the vendor computing device 186 to the PaaS server 102, where the information is communicated to the PaaS server 102 via the westbound or vendor interface 116.

Claim and Association Phases.

Figure 15:
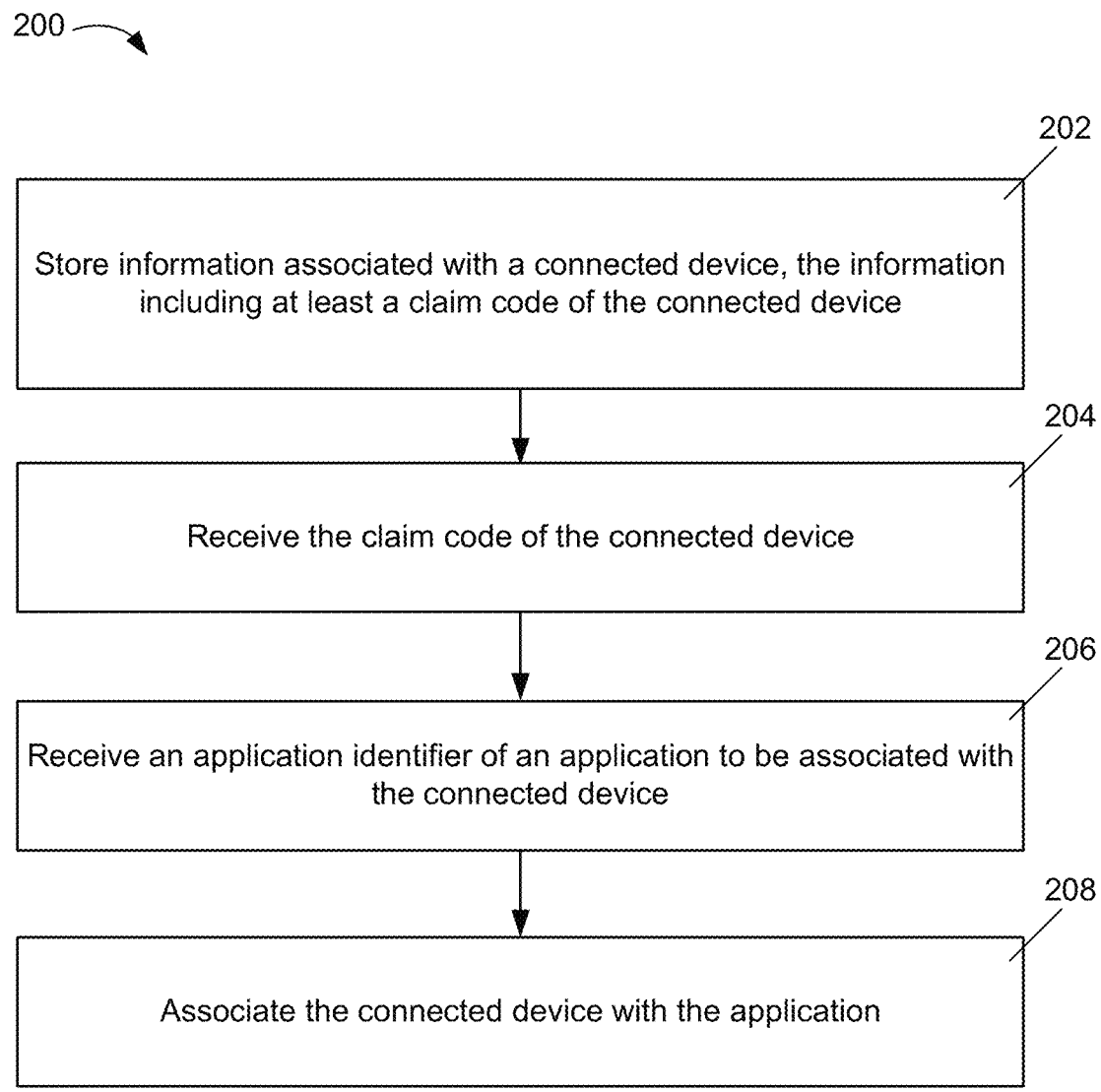
FIG. 15 illustrates an example method for claiming a connected device and associating the connected device with applications during claim and association phases of a PaaS system.
Figure 16:
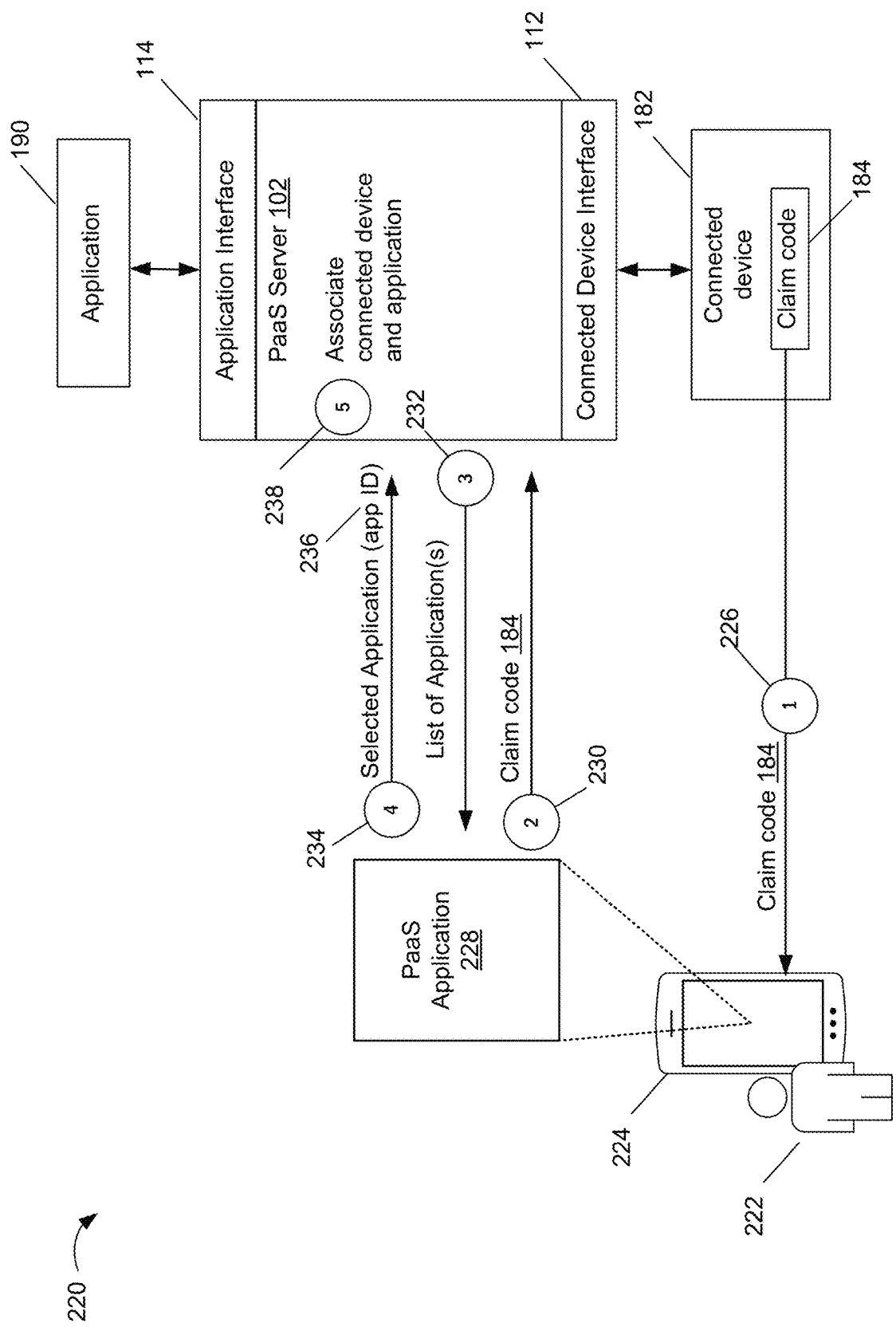
FIG. 16 is a process flow diagram illustrating a device-initiated claiming and association process.

FIG. 15 illustrates an example method 200 for claiming a connected device such as connected device 182 and associating the connected device 182 with one or more of the applications 106 (e.g., application 190 illustrated in FIG. 16). In this example, the method 200 is described as being performed by the PaaS server 102.

Method 200 may begin at operation 202, where the PaaS server 102 stores information associated with the connected device 182, where the information includes at least the claim code 184 of the connected device 182. In some embodiments, a vendor of the connected device 182 generates and associates the claim code 184 with the connected device 182, and provides the claim code 184 to the PaaS server 102 for storage. In other embodiments, the vendor 178 selects for or provides approval to the PaaS server 102 to generate and store the claim code 184. In some examples, the claim code 184 is returned to the vendor 178 and the vendor 178 then associates the claim code 184 with the connected device 182. In further embodiments, the connected device 182 can generate the claim code 184 and provide to the PaaS server 102.

At operation 204, the PaaS server 102 receives the claim code 184 of the connected device 182. The claim code 184 can be received from an owner of the connected device 182, for example, who is attempting to claim the connected device 182 to prove ownership and associate one or more of the applications 106 with the connected device 182. Receipt of the claim code 184 from the owner can initiate a claiming process. In some embodiments, the claiming process is a device-initiated claiming process. For example, the owner may have purchased or otherwise have taken possession or ownership of the connected device 182, but does not know which of the one or more applications 106 they would like to be associated with the connected device 182. Examples of the device-initiated claiming process are provided with respect to FIGS. 16 and 17. In other embodiments, the claiming process is an application-initiated process. For example, the owner already has, is familiar with, or uses the application 190 and knows they would like to associate the connected device 182 with the application 190. Examples of application-initiated claiming processes are provided with respect to FIGS. 18-20. Depending on a type of claiming process the claim code 184 can be received from a PaaS application being rendered on a computing device of the owner (e.g., an owner computing device) or the application 190 itself that is executing on the owner computing device.

At operation 206, the PaaS receives an application identifier of the application 190 to be associated with the connected device 182. The application identifier can be received from either the PaaS application rendered in a web browser on the owner computing device or the application 190 itself executing on the owner computing device. Similar to the claim code 184, a manner and timing in which the application identifier is received depends on a type of the claiming process. For example, in some embodiments, the application identifier is received as part of a selection of the application 190 or a URL of the application 190 provided through the PaaS application. In other embodiments, the application identifier is received from the PaaS application in response to a manual entry of an application code through the user interface of the PaaS application or a machine-readable application code of the application 190 being scanned, where the application identifier is associated with the application code. In further embodiments, the application identifier is received from the PaaS application in response to the owner's selection of a link to claim the connected device 182 within the application 190 executing on the owner computing device, where the application identifier is associated with the link. In yet further embodiments, the application identifier is received from an API interaction of the application 190.

At operation 208, the PaaS server 102 associates the connected device 182 with the application 190, and the method 200 ends.

FIG. 16 is a process flow diagram illustrating a device-initiated claiming and association process. For example, the process is a userless, one-time device claiming and association process 220.

An owner 222 purchases or otherwise takes possession or ownership of the connected device 182. The owner 222 wishes to claim the connected device 182 in order to prove ownership and associate one or more of the applications 106 with the connected device 182. However, the owner 222 may not know which of the applications 106 he or she would like to have associated with the connected device 182. The owner 222 can use a computing device, such as owner computing device 224 to claim the connected device 182.

To initiate the claiming process, a claim code 184 of the connected device 182 is retrieved at operation 226. In some embodiments, the claim code 184 is in a form of a machine-readable code, such as a barcode, a QR code, or an RFID code. The claim code 184 can be directly printed on the connected device 182, printed on a sticker or other similar adhesive placed on the connected device 182, printed on a packaging associated with the connected device 182, or printed on instructions associated with the connected device 182, among other similar examples. In some examples, when the claim code 184 is a machine-readable code, the owner computing device 224 retrieves the claim code 184 by executing a code scanning application that scans the claim code 184. The scanning of the claim code 184 then causes a PaaS application 228 to be rendered or otherwise launched on the owner computing device 224. For example, in some embodiments, the PaaS application 228 can be executing on the PaaS server 102 and is rendered through a web browser on the owner computing device 224. In other embodiments, the PaaS application 228 is a local or native application that is executed on the owner computing device 224.

In other examples, the owner 222 can manually enter a uniform resource locator (URL) for the PaaS application 228 into a web browser on the owner computing device 224 to render or otherwise launch the PaaS application 228 on the owner computing device 224. The owner 222 may then manually enter the claim code 184 through the PaaS application 228, for example, and select to claim the connected device 182. For example, the claim code 184 is a numerical code to be entered. In some examples, the numerical code is provided in addition to and corresponds with the machine-readable code.

In further embodiments, the claim code 184 can be in the form of a "bump" profile, a NFC or Bluetooth provided piece of information, a serial-port or USB local communication, or other digitally supplied mechanism such that the claim code 184 is retrievable by the owner computing device 224 and/or PaaS application 228.

In some examples, the connected device 182 has a capability or feature that allows the owner 222 to enter the claim code 184 as a new claim code on the connected device 182 or the connected device 182 can automatically generate the claim code 184 itself. The connected device 182 then provides the claim code 184 to the PaaS server 102 via the connected device interface 112.

Optionally, the PaaS application 228 receives a claim context in addition to the claim code 184. The claim context can be received per connected device from the scanning of the claim code 184 and/or manual entry of the claim code 184. The claim context is utilized post-association of the connected device 182 with the application 190.

Once the PaaS application 228 has received the claim code 184, the PaaS application 228 provides the claim code to the PaaS server 102 at operation 230. In response, the PaaS server 102 can provide the list of applications to be displayed through the PaaS application 228 at operation 232. The list includes one or more pre-set applications that are capable of being associated with the connected device 182, where the PaaS server 102 identifies the connected device 182 based on the received claim code 184. In some embodiments, the owner 222 selects an application from the list. In other embodiments, the owner 222 creates a new or custom application for association with the connected device 182 that is not part of the list. For example, an "other" option can be included within the list, that when selected allows the owner 222 to enter the URL of the new or customized application they wish to associate with the connected device 182.

An application selected or newly created by the owner 222, such as application 190, through the PaaS application 228 is provided to the PaaS server 102 at operation 234. An application identifier 236 (e.g., app ID) associated with the application 190 is provided to the PaaS server 102 as part of the selection or provided URL. Additionally, an application configuration is provided along with the application identifier 236. The application configuration includes access and credential information, including a webbook URL or Murano™ solution context identifier and access keys enabling secure data routing to the application 190.

Once the application identifier 236 is received, the PaaS server 102 associates the connected device 182 with the application 190 at operation 238. For example, the PaaS server 102 links the connected device 182 and the application 190 within one or more data structures of the PaaS server 102. As described in greater detail below with respect to FIGS. 21 and 22, the association or linkage facilitates interaction between the application 190 and the connected device 182 when data or other types of communications are received at the PaaS server 102 from the connected device 182 or the application 190 via the connected device interface 112 or application interface 114, respectively.

Optionally, the owner 222 can create a login for the PaaS server 102 after the connected device 182 and the application 190 are associated. Creation of the login allows the owner 222 to later manage the associations between the connected device 182 and the application 190, as well as other add or remove other associations. The login can be created at various times before, during, or after the claiming process, as further illustrated by FIG. 17.

Figure 17:
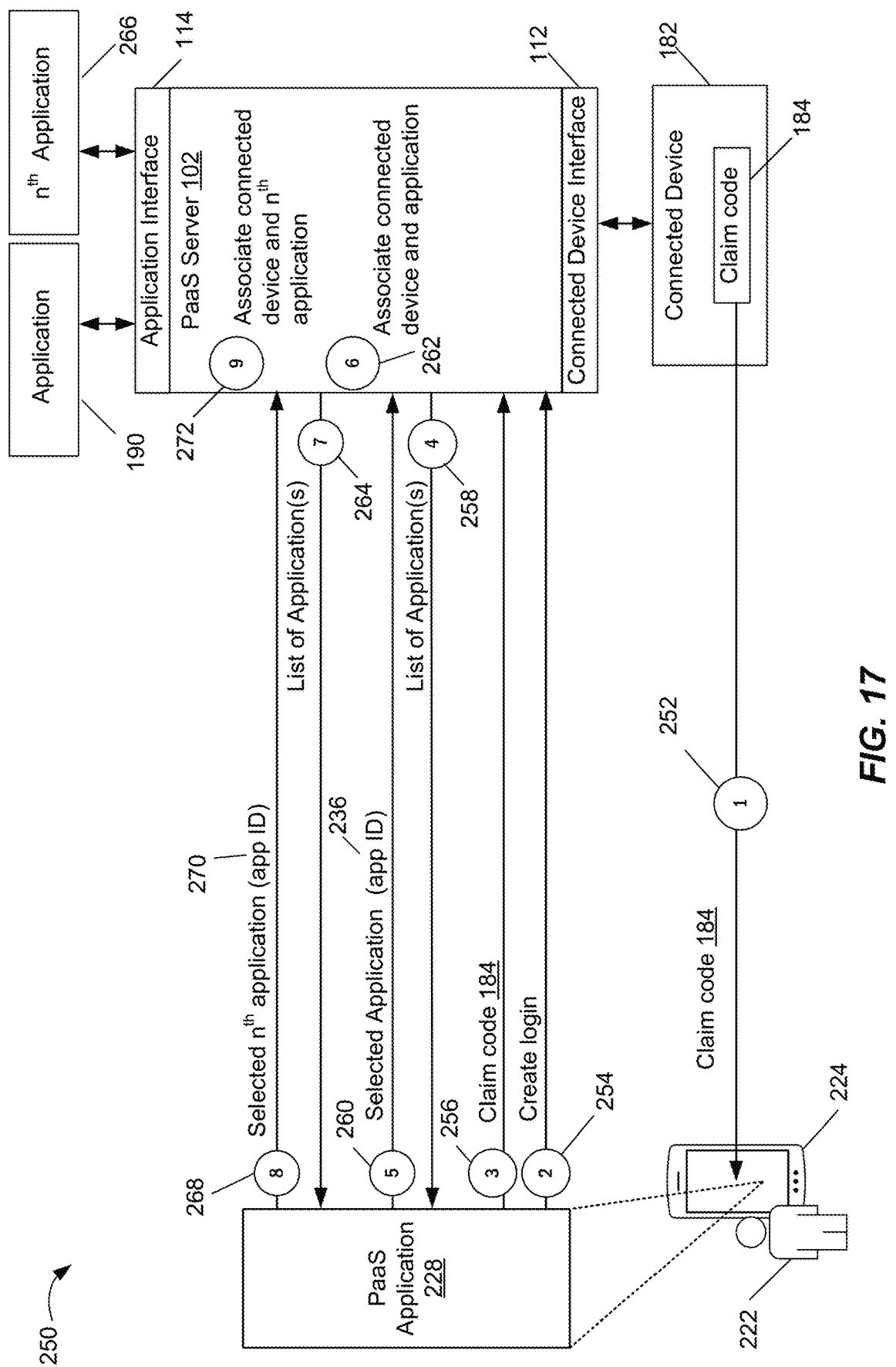
FIG. 17 is a process flow diagram illustrating another device-initiated claiming and association process.

FIG. 17 is a process flow diagram illustrating another device-initiated claiming and association process. For example, the process is a multi-use device claiming and association process 250.

The owner 222 purchases or otherwise takes possession or ownership of the connected device 182. The owner 222 may wish to claim the connected device 182 in order to be able to associate one or more of the applications 106 with the connected device 182. However, the owner 222 may not know which of the applications 106 he or she would like to have associated with the connected device 182. The owner 222 can use a computing device, such as owner computing device 224 to claim the connected device 182.

To initiate the claiming process, the claim code 184 of the connected device 182 is retrieved at operation 252. As discussed in greater detail with respect to FIG. 16, in some embodiments, the claim code 184 is in a form of a machine-readable code, and the owner computing device 224 can retrieve the claim code 184 by executing a code scanning application that scans the claim code 184. The scanning of the claim code 184 then causes a PaaS application 228 to be rendered or otherwise launched on the owner computing device 224. In other examples, the owner 222 can manually enter a URL for the PaaS application 228 into a web browser on the owner computing device 224 to render or otherwise launch the PaaS application 228 on the owner computing device 224. The owner 222 may then manually enter the claim code 184 through a user interface of the PaaS application 228, for example, and select to claim the connected device 182. In further embodiments, the claim code 184 can be in the form of a "bump" profile, a NFC or Bluetooth provided piece of information, a serial-port or USB local communication, or other digitally supplied mechanism such that the claim code 184 is retrievable by the owner computing device 224 and/or PaaS application 228.

Once the PaaS application 228 has rendered on the owner computing device 224, the owner is prompted to create a login for the PaaS server 102 at operation 254. Creation of the login allows the owner 222 to later manage associations between the connected device 182 and one or more applications, including adding and removing associations. Optionally, the PaaS application 228 receives a claim context per login. The claim context is utilized by the applications post-association with the connected device 182.

At operation 256, the PaaS application 228 provides the claim code 184 to the PaaS server 102. In response, the PaaS server 102 can provide the list of applications to be displayed through the user interface of the PaaS application at operation 258. The list includes one or more pre-set applications that are capable of being associated with the connected device 182, where the PaaS server 102 identifies the connected device 182 based on the received claim code 184. In some embodiments, the owner 222 selects an application from the list. In other embodiments, the owner 222 creates a new or custom application for association with the connected device 182 that is not part of the list. For example, an "other" option can be included within the list, that when selected allows the owner 222 to enter the URL of the new or customized application they wish to associate with the connected device 182.

An application, such as application 190, selected or newly created by the owner 222 through the user interface of the PaaS application 228 is provided to the PaaS server 102 at operation 260. An application identifier 236 (e.g., app ID) associated with the application 190 is provided to the PaaS server 102 as part of the selection or the provided URL. Additionally, an application configuration is provided along with the application identifier 236. The application configuration includes access and credential information, including a webbook URL or Murano™ solution context identifier and access keys enabling secure data routing to the application 190. Once the application identifier 236 is received, the PaaS server 102 associates the connected device 182 with the application 190 at operation 262. In some examples, the association further includes an association of the connected device 182 with the login created at operation 254.

In some embodiments, the owner 222 may want to associate other applications (e.g., up to $n^{th}$ application) with the connected device 182. Therefore, at operation 264, the PaaS server 102 can provide the list of applications to be displayed through the PaaS application 228. The list can include the same applications provided in the list at operation 258 or new applications. Similarly, the owner 222 can create a new or custom application rather than select an application from the list.

An application, such as $n^{th}$ application 266, selected or newly created by the owner 222 through the PaaS application 228 is provided to the PaaS server 102 at operation 268. An application identifier 270 (e.g., app ID) associated with the $n^{th}$ application 266 is provided to the PaaS server 102 as part of the selection or provided URL. Once the application identifier 270 is received, the PaaS server 102 associates the connected device 182 with the $n^{th}$ application 266 at operation 272.

In some examples, the association of the connected device 182 with the login created at operation 254 can be updated to indicate the new association between the connected device 182 and the $n^{th}$ application 266. In some examples, the $n^{th}$ application 266 is associated with the connected device 182 in addition to the application 190. In other examples the association of the $n^{th}$ application 266 with the connected device 182 replaces the association between the application 190 and the connected device 182. A group identifier of the connected device 182 maintained by the PaaS server 102 can enable the connected device 182 to be associated with the multiple applications, and allow the reset or replacement of associations.

As described in greater detail below with respect to FIGS. 21 and 22, the association or linkage facilitates interaction between the application 190 and/or $n^{th}$ application 266 and the connected device 182 when data or other types of communications are received at the PaaS server 102 from the connected device 182, the application 190, or the $n^{th}$ application 266 via the connected device interface 112 or application interface 114, respectively.

Figure 18:
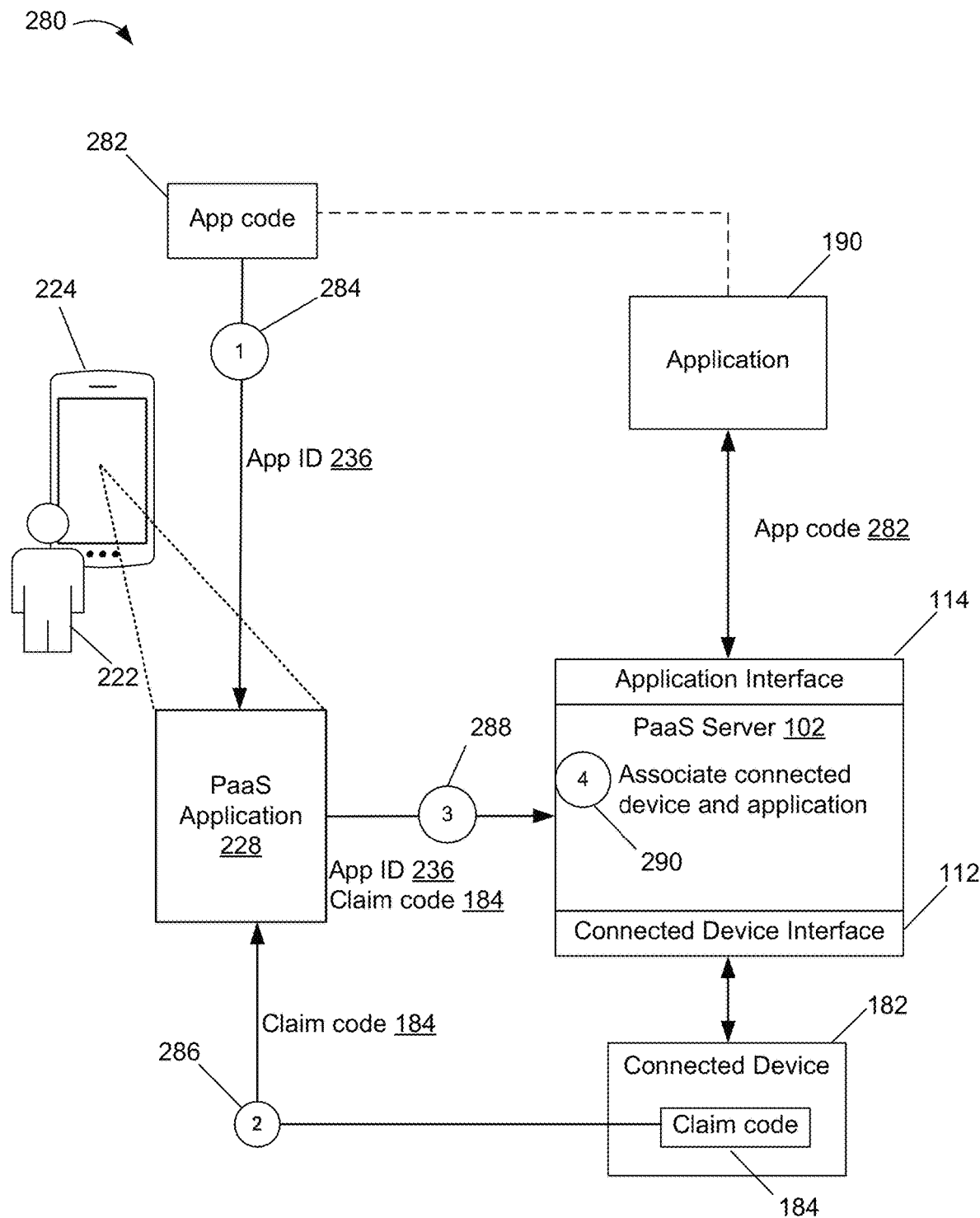
FIG. 18 is a process flow diagram illustrating an application-initiated claiming and association process.

FIG. 18 is a process flow diagram illustrating an application-initiated claiming and association process. For example, the process is a first type of an application initiated device claiming and association process 280.

In this embodiment, the owner 222 already has, is familiar with, or uses the application 190 and purchases or otherwise takes possession or ownership of the connected device 182 knowing that he or she would like to associate the connected device 182 with the application 190. The owner 222 can use a computing device, such as the owner computing device 224 to claim the connected device 182.

To initiate the claiming process, an application code 282 of the application 190 is retrieved at operation 284. In some embodiments, the application code 282 can be generated by the PaaS server 102. An API of application 190 can communicate via application interface 114 to generate the application code 282 (e.g., using POST /interface/v1/claim API call from Table 1).

In some embodiments, the application code 282 is in a form of a machine-readable code, such as a barcode, a QR code, or an RFID code. In some examples, the application code 282 can be displayed through the application 190 executing on the owner computing device 224. In other examples, the application code 282 can be displayed on another computing device (e.g., through the application 190 executing on the other device, an application store, or other similar application marketplace). In further examples, the application code 282 can be printed on a material, such as a packaging of the connected device 182 or printed on instructions associated with the connected device 182, among other similar examples.

In some embodiments, when the application code 282 is a machine-readable code, the owner computing device 224 can retrieve the application code 282 by executing a code scanning application that scans the application code 282. The scanning of the application code 282 then causes the PaaS application 228 to be rendered or otherwise launched on the owner computing device 224. In other examples, the owner 222 can manually enter a URL for the PaaS application 228 into a web browser on the owner computing device 224 to render or otherwise launch the PaaS application 228 on the owner computing device 224. The owner 222 may then manually enter the application code 282 through a user interface of the PaaS application 228. For example, the application code 282 includes a numerical code to be entered. In some examples, the numerical code is provided in addition to and corresponds with the machine-readable code.

In some embodiments, the application code 282 has the application identifier 236 embedded within its code or is the application identifier 236. Therefore, when the application code 282 is scanned or manually entered, the application identifier 236 for the application 190 is provided to the PaaS application 228. In other examples, the application code 282 itself is provided to the PaaS application 228, and the PaaS application 228 is able to use the application code 282 it generated as a reference to identify the application identifier 236. Additionally, in some embodiments, other metadata associated with the application 190 can be provided to the PaaS application 228 along with the application identifier 236 (or alternatively the application code 282). For example, the metadata can include an application configuration. The application configuration includes access and credential information, including a webbook URL or Murano™ solution context identifier and access keys enabling secure data routing to the application 190. The metadata can further include claim context, such as an identifier of the application user (e.g., the owner 222) associated with claiming the connected device 182.

At operation 286, the claim code 184 of the connected device 182 can be retrieved. In some embodiments, the PaaS application 228 has a code scanning capability or feature that allows the claim code 184, if in machine-readable code form, to be scanned using the PaaS application 228. For example, the PaaS application 228 can have an integrated code scanning capability or can be communicatively coupled with another application, such as the code scanning application executing on the owner computing device 224 to provide the feature. In other embodiments, the owner 222 can manually enter the claim code 184 through a user interface of the PaaS application 228.

The PaaS application then provides the application identifier 236 and the claim code 184 to the PaaS server 102 at operation 288. In some examples, the other metadata associated with the application 190 is also provided to the PaaS server 102, including at least the application configuration and the claim context. At operation 290, the PaaS server 102 associates the connected device 182 and the application 190. For example, the PaaS server 102 links the connected device 182 and the application 190 within one or more data structures of the PaaS server 102. As described in greater detail below with respect to FIGS. 21 and 22, the association or linkage facilitates interaction between the application 190 and the connected device 182 when data or other types of communications are received at the PaaS server 102 from the connected device 182 or the application 190 via the connected device interface 112 or application interface 114, respectively. In some embodiments, when the PaaS server 102 communicates with the application 190 via the application interface 114, the application 190 can use the metadata that was established at claiming time to determine how the information from the connected device 182 should be rendered to the application user (e.g., the owner 222).

Figure 19:
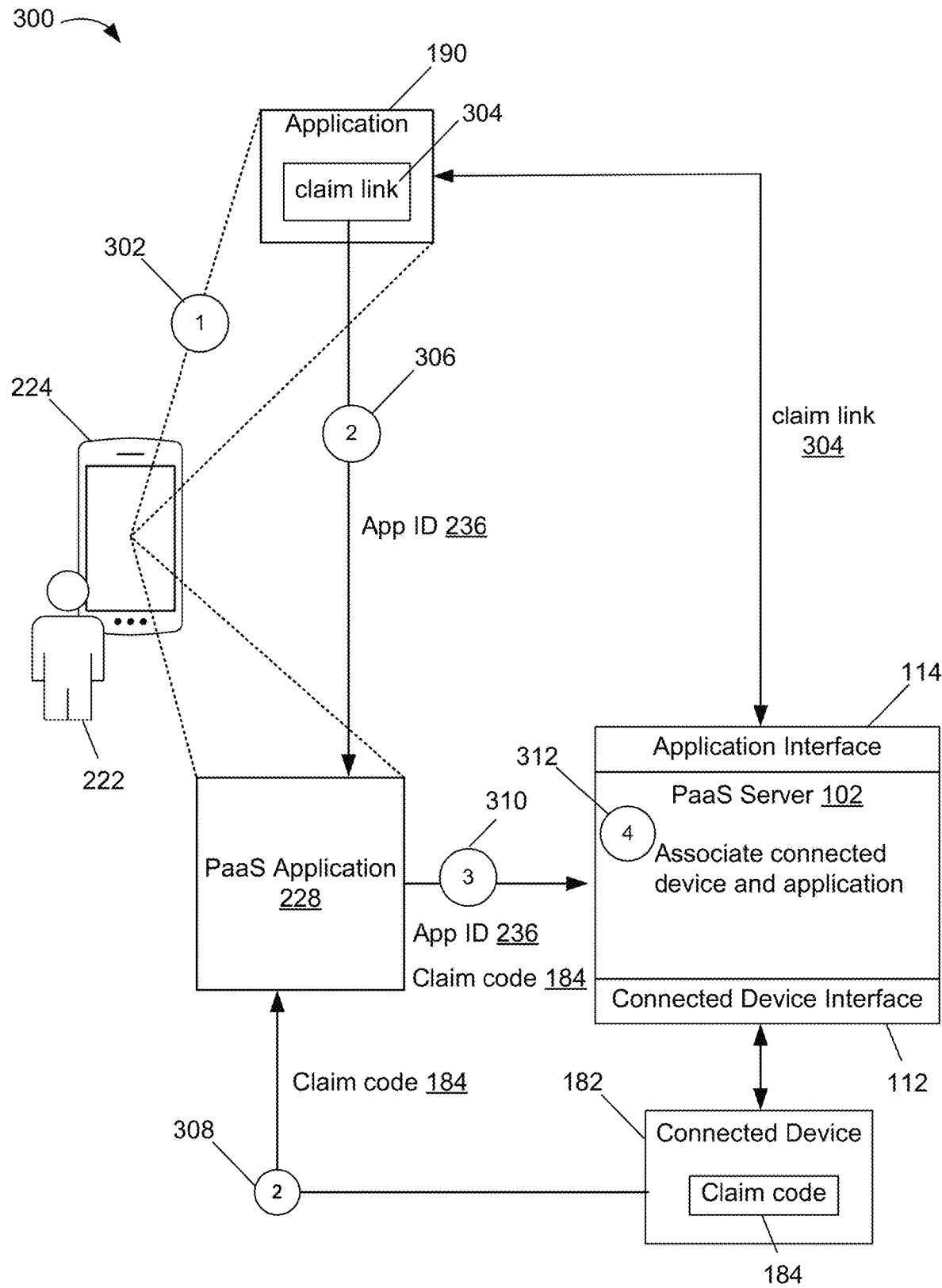
FIG. 19 is a process flow diagram illustrating another application-initiated claiming and association process.

FIG. 19 is a process flow diagram illustrating another application-initiated claiming and association process. For example, the process is a second type of an application initiated device claiming and association process 300.

In this embodiment, the owner 222 already has, is familiar with, or uses the application 190 and purchases or otherwise takes possession or ownership of the connected device 182 knowing that he or she would like to associate the connected device 182. The owner 222 can use a computing device, such as the owner computing device 224 to claim the connected device 182.

To initiate the claiming process, the owner 222 can open or otherwise launch the application 190 on the owner computing device 224 at operation 302. In some examples, the application 190 is a local application that is executed by the owner computing device 224. In other examples, the application 190 is executed by a server (e.g., located in the cloud) and the application 190 is rendered on the owner computing device 224 through a web browser. In some embodiments, a link to claim connected devices (e.g., claim link 304), can be generated by the PaaS server 102 and provided to application 190 for display within the application 190 An API of application 190 can communicate via application interface 114 to generate the claim link 304 (e.g., using the POST/interface/v1/get TempClaimURL API call from Table 1).

Upon the owner's selection of the claim link 304 through the application 190, the PaaS application 228 is automatically rendered or otherwise launched on the owner computing device 224 at operation 306. In some examples, the application identifier 236 for the application 190 is provided to the PaaS application 228 in response to the selection (e.g., because the application identifier 236 is defined by or is associated with the claim link 304). Additionally, other metadata associated with the application 190 can be provided to the PaaS application 228, as discussed above within respect to FIG. 18. The other metadata can be an example of an application configuration and claim context received from the claim link 304.

At operation 308, the claim code 184 of the connected device 182 can be retrieved. In some embodiments, the PaaS application 228 has a code scanning capability or feature that allows the claim code 184, if in machine-readable code form, to be scanned using the PaaS application 228. For example, the PaaS application 228 can have an integrated code scanning capability or can be communicatively coupled with another application, such as a code scanning application executing on the owner computing device 224 to provide the feature. In other embodiments, the owner 222 can manually enter the claim code 184 through a user interface of the PaaS application 228.

The PaaS application then provides the application identifier 236 and the claim code 184, as well as any other metadata associated with the application 190, to the PaaS server 102 at operation 310. At operation 312, the PaaS server 102 associates the connected device 182 and the application 190. As described in greater detail below with respect to FIGS. 21 and 22, the association or linkage facilitates interaction between the application 190 and the connected device 182 when data or other types of communications are received at the PaaS server 102 from the connected device 182 or the application 190 via the connected device interface 112 or application interface 114, respectively.

Figure 20:
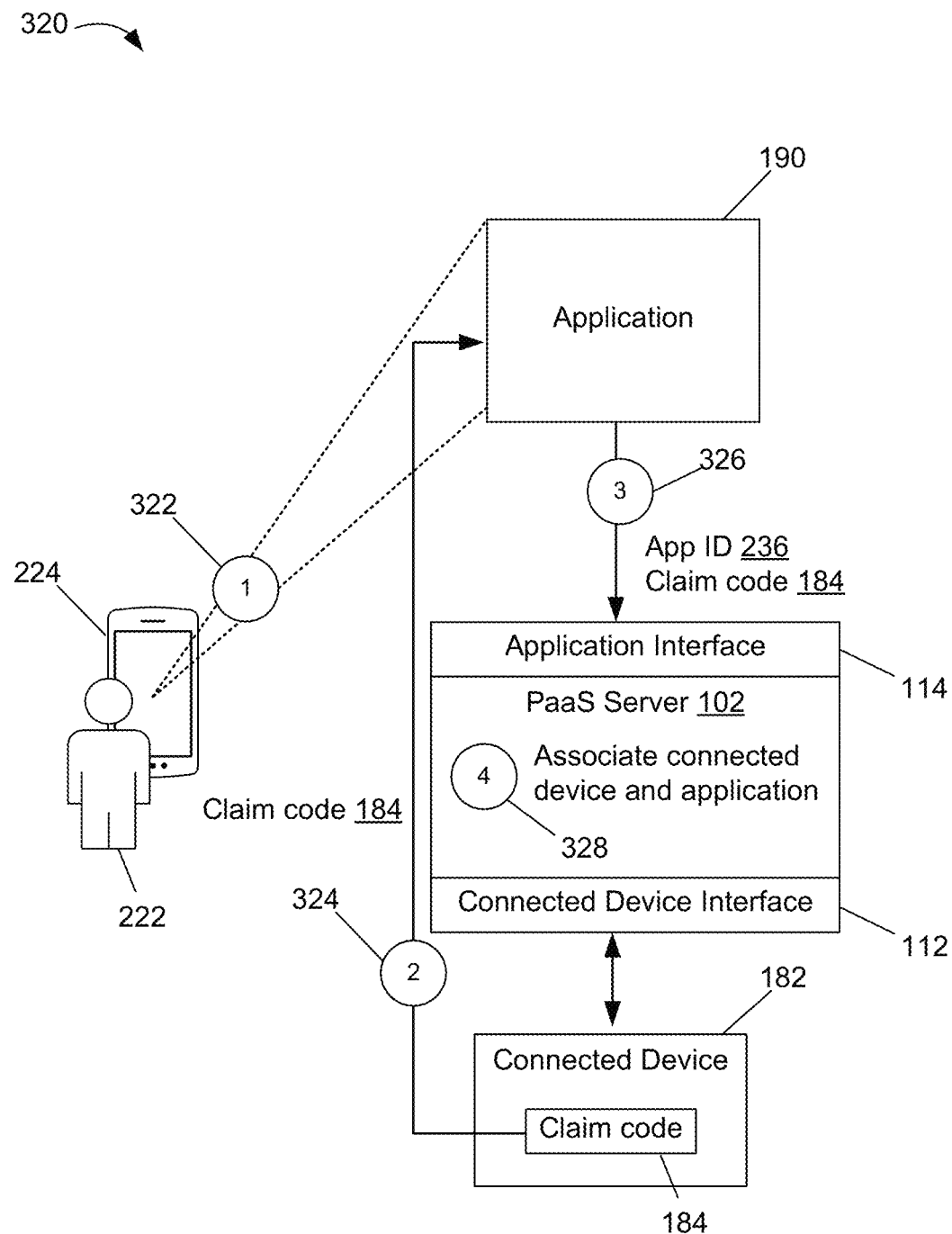
FIG. 20 is a process flow diagram illustrating a further application-initiated claiming and association process.

FIG. 20 is a process flow diagram illustrating a further application-initiated claiming and association process. For example, the process is an application managed claiming and association process 320.

In this embodiment, the owner 222 already has, is familiar with, or uses the application 190 and purchases or otherwise takes possession or ownership of the connected device 182 knowing that he or she would like to associate the connected device 182. The owner 222 can use a computing device, such as the owner computing device 224 to claim the connected device 182.

To initiate the claiming process, the owner 222 can open or otherwise launch the application 190 on the owner computing device 224 at operation 322. In some examples, the application 190 is a local application that is executed by the owner computing device 224. In other examples, the application 190 is executed by a server (e.g., located in the cloud) and the application 190 is rendered on the owner computing device 224 through a web browser.

At operation 324, the claim code 184 of the connected device 182 can be retrieved. In some embodiments, the application 190 has a code scanning capability or feature that allows the claim code 184, if in machine-readable code form, to be scanned using the application 190. For example, the application 190 can have an integrated code scanning capability or can be communicatively coupled with another application, such as a code scanning application executing on the owner computing device 224 to provide the feature. In other embodiments, the owner 222 can manually enter the claim code 184 through a user interface of the application 190.

At operation 326, the application 190 provides the claim code 184 retrieved at operation 324 along with the application identifier 236 of the application 190 to the PaaS server 102 via the application interface 114. The application identifier 236 can be provided via an API interaction of the application 190 that communicates with the PaaS server 102 via the application interface 114. Additionally, other metadata associated with the application 190 can be provided to the PaaS application 228 via the API interaction of the application 190. The other metadata can include an application configuration and claim context received from the API interaction of the application 190.

At operation 328, the PaaS server 102 associates the connected device 182 and the application 190. As described in greater detail below with respect to FIGS. 21 and 22, the association or linkage facilitates interaction between the application 190 and the connected device 182 when data or other types of communications are received at the PaaS server 102 from the connected device 182 or the application 190 via the connected device interface 112 or application interface 114, respectively.

Figure 21:
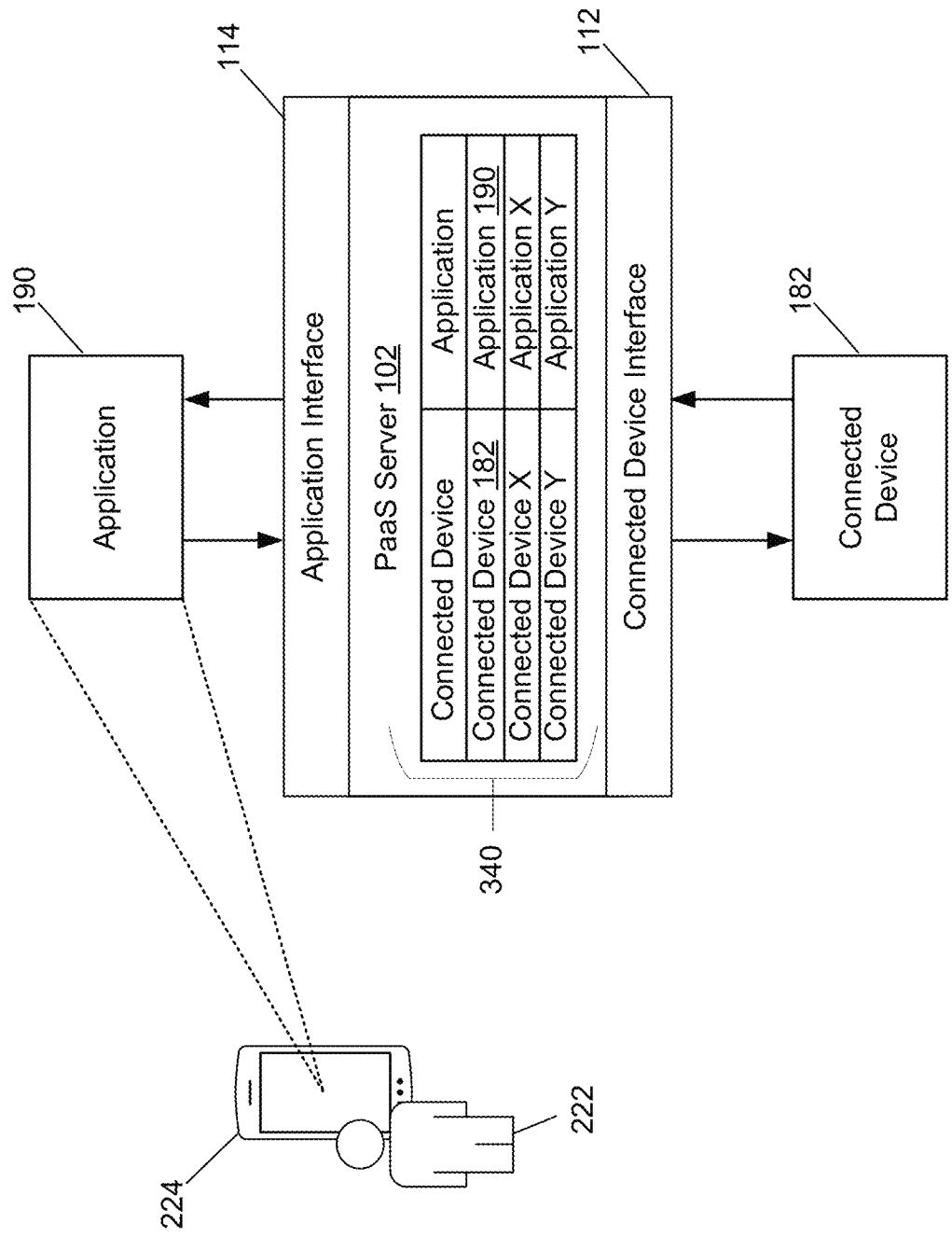
FIG. 21 is a conceptual diagram illustrating facilitation of interactions between an associated connected device and application during an association phase of a PaaS system.

FIG. 21 is a conceptual diagram illustrating facilitation of interactions between the associated connected device 182 and application 190 during an association phase 164 of the PaaS system 100. After the connected device 182 and the application 190 have been associated by the PaaS server 102, interaction between the connected device 182 and the application 190 is facilitated by the PaaS server 102. For example, the PaaS server 102 interacts as a routing entity for data or communications received from the connected device 182 via the connected device interface 112 to the application 190, and for data or communications received from the application 190 via the application interface 114 to the connected device 182. The routing performed by PaaS server 102 can be dynamic or static.

The PaaS server 102 facilitates the interaction using the association. In some embodiments, one or more data structures of the PaaS server store the association to link the connected device 182 to the application 190. Data structure 340 is one example structure for storing pairs of associated connected devices and applications, such as the connected device 182 and the application 190. Therefore, when a communication is received from the application 190, for example, the data structure 340 can be referenced to identify which connected device (e.g., connected device 182) the application 190 is associated with. Additional examples of the data structures are provided with respect to FIG. 22 below.

To provide an illustrative example, the connected device 182 may be a smart wall outlet plug. The application 190 may be an energy control application that is able to control devices plugged into the smart wall outlet plug via interactions with the smart wall outlet plug, among other features. The energy control application may be a local application installed on the owner computing device. In some instances, the owner 222 opens the energy control application on the owner computing device 224 and selects to turn off a lamp, for example, that is currently plugged into the smart wall outlet plug through a user interface of the energy control application. The energy control application communicates this command (e.g., to turn off the lamp) to the PaaS server 102 via the application interface 114. For example, the energy control application may communicate the command using POST/interface/v1/setIdentityState API call from Table 1. The PaaS server 102 references the data structure 340 to determine the smart wall outlet plug (e.g., the connected device 182) is the connected device that the energy control application (e.g., the application 190) is associated with or paired to. The PaaS server 102 then routes the command to the smart wall outlet plug and the smart wall outlet plug may accordingly execute the command to turn off the lamp.

Additionally, the smart wall outlet plug is collecting data associated with its environment. For example, how many devices and what types of devices are plugged into the smart wall outlet, an amount of energy consumed by those devices over time, and other similar data can be collected. In some instances, the smart wall outlet plug periodically provides the data to the energy control application. In other examples, the energy control application requests to receive the data via the application interface 114 (e.g., using POST/interface/v1/getIdentity and POST/interface/v1/getIdentity State API calls from Table 1). The energy control application can analyze the data and provide reports based on the analysis to the owner 222 periodically or upon request.

The PaaS server 102 receives the data from the smart wall outlet plug via the connected device interface 112 passively or in response to a request from the energy control application to provide the data. The PaaS server 102 references the data structure 340 to determine the energy control application (e.g., the application 190) is the application that the wall outlet plug (e.g., the connected device 182) is associated with or paired to. The PaaS server 102 then routes the data to the energy control application.

In some embodiments the PaaS server 102 also associates the connected device with an owner (in other words, it identifies the owner of the connected device), such as a user (or group) that has claimed ownership of the device through a claiming process as described herein. For example, one or more of the data structures associate the connected devices (identity ID) with the owner (owner ID). One example of this is illustrated in further detail with reference to FIG. 22.

Figure 22:
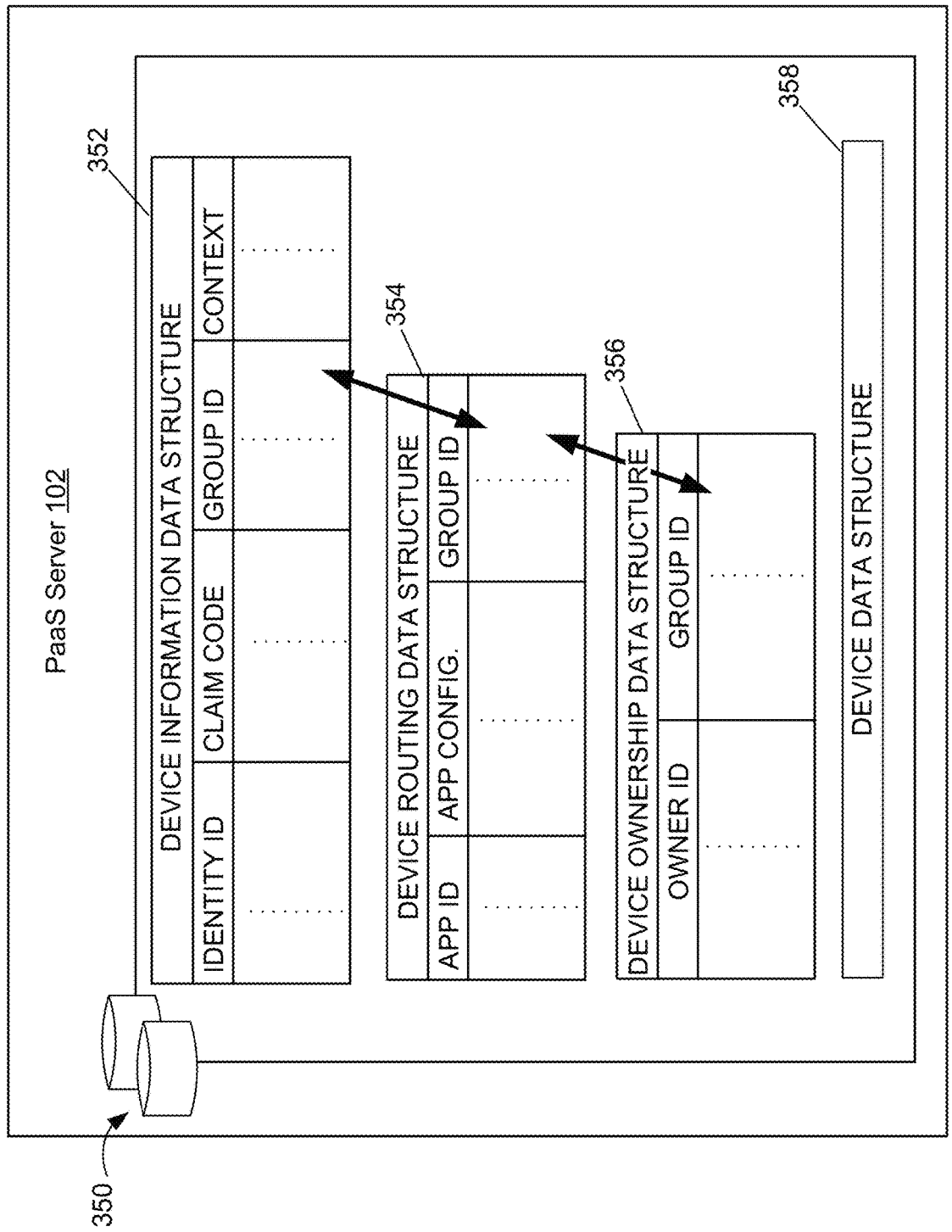
FIG. 22 is a conceptual diagram illustrating data structures of a product-as-a-service server (PaaS server).

FIG. 22 is a conceptual diagram illustrating data structures of the PaaS server 102. To facilitate interactions between the connected devices 104 and applications 106 during the association phase 164, the PaaS server 102 stores one or more data structures within one or more databases 350 of the PaaS server 102. Example data structures within the databases 350 include a device information data structure 352, a device routing data structure 354, a device ownership data structure 356, and a device data structure 358.

The device information data structure 352 can store for each of the connected devices 104: an identity identifier, a claim code, a group identifier, and a claim context. The identity identifier is a connected device identifier. Each of the connected devices 104 has a distinct identity identifier. The claim codes (e.g. claim codes 180) are random character codes that can be used to prove ownership of the connected devices 104. In some embodiments, the identity identifiers and the claim codes are received from the vendors 110 of the connected devices 104 during the setup phase 160 and stored in the device information data structure 352. In other embodiments, the PaaS server 102 generates and subsequently stores the claim codes along with the identity identifiers in response to receiving a selection and/or approval from the vendors 110 to generate the claim codes. In further embodiments, the claim codes can be generated by the connected devices 104 and provided to the PaaS server 102 via the connected device interface 112.

The group identifier is an identifier established for the connected device 182 upon the connected device 182 being claimed that provides application and pairing context, which allows the connected devices 104 to associate or pair with a plurality of the applications 106. In its simplest implementation, the group identifier is an application identifier (e.g., when the connected device is only associated with one application). To reset ownership of the connected device 182, the group identifier is removed. The claim context is optional context provided as part of the claiming of the connected device. For example, the claim context can include an identifier of the application user (e.g., the owner).

The device routing data structure 354 can store for each of the applications 106 associated with at least one of the connected devices 104: an application identifier, an application configuration, and a group identifier. The application identifier is a unique identifier of each of the applications 106. The application identifier can be retrieved from a selection of the application within a list, a provided URL of the application, an application code, a link to claim connected devices, or an API interaction of the application. The application configuration includes access and credential information, including a webbook URL or Murano™ solution context identifier and access keys enabling secure data routing to the application. The group identifier is a same group identifier discussed above with respect to the device information data structure 352. The group identifier can be mapped with one or more application identifiers and associated application configurations (e.g., mapped to identifiers and configuration of each application associated with the connected device 182).

The device ownership data structure 356 can store for each of the applications 106 associated with at least one of the connected devices 104: a group identifier and an owner identifier. The group identifier is a same group identifier discussed above with respect to the device information data structure 352, and as represented by arrows in FIG. 22, the group identifier connects the data in the device ownership data structure 356 with the data in the device routing data structure 354 and the device information data structure 352. The owner identifier includes, for example, contact information, credential and preferences of the owner 222.

The device data structure 358 stores device data, such as last reported values, and derived connected device status, such as "last seen" timestamp. The reported device data can be stored over time in a time-series database (such as available through the Murano™ cloud-based IOT platform by Exosite LLC of Minneapolis, Minn.) enabling historical data aggregation & analysis. For example, values are time-stamped allowing time based queries, aggregations and roll-ups of values. Static content in raw file format uploaded by the connected devices are also stored.

When the PaaS server 102 receives data or other communications from an application via the application interface 114 to provide to a connected device, the PaaS server 102 references the device routing data structure 354 to locate a group identifier corresponding to (e.g., within a same row as) the application identifier of the application. The application identifier can be received from the API interaction of the application via the application interface 114 when providing the data or other communications, for example. The device information data structure 352 is then referenced to identify the same group identifier located in the device routing data structure 354. When the matching group ID is discovered, the identity identifier associated with (e.g., within the same row as) the group identifier in the device information data structure 352 is determined. The data or other communications are then routed to the connected device with the identity identifier Similarly, when the PaaS server 102 receives data or other communications from a connected device via the connected device interface 112 to provide to an application, the PaaS server 102 references the device information data structure 352 to locate a group identifier corresponding to (e.g., within a same row as) the claim code of the connected device. In some examples, the claim code and/or the group identifier are included in data or communications received from the connected device. The device routing data structure 354 is then referenced to identify the matching group identifier. When the matching group identifier is discovered, the application identifier associated with (e.g., within the same row as) the group identifier in the device routing data structure 354 is determined. The data or other applications are then routed to the application associated with the application identifier. In some embodiments, more than one application identifier is associated with the group identifier and the data or other communications are routed to each of the applications associated with the application identifiers. In some embodiments, the PaaS server 102 validates and/or normalizes the data or other communications before routing. Additionally, the PaaS server 102 can annotate the data or other communication with routing information.

The data structures described herein are non-limiting examples of mechanisms for facilitating interactions between connected devices and applications. Other mechanisms for linking, pairing, or otherwise storing the association are possible.

The present disclosure describes multiple types of computing devices, including server computing devices, client or owner computing devices, and connected (or IoT) devices. A computing device can be used to execute any of the operating systems, application programs, server operating environments, and software modules or engines described herein. A computing device typically includes at least one processing device, and at least one computer-readable storage device. In some embodiments, the computer-readable storage device stores data instructions that, when executed by the at least one processing device, cause the processing device to perform the methods, operations, or actions described herein. By way of example, a computing device includes, in some embodiments, at least one processing device, such as a central processing unit (CPU). A variety of processing devices are available from a variety of manufacturers, for example, Intel or AMD. In some embodiments, a computing device may also include system memory, and a system bus that couples various system components including the system memory to the processing device. The system bus may be any one of a number of types of bus structures including a memory bus, or memory controller; a peripheral bus; and a local bus using any variety of bus architectures.

In some embodiments, the computing device also includes a communication device. A communication device allows the computing device to communicate data with other computing devices. Examples of communication devices include wired and wireless data communication devices. Wired communication devices include serial, parallel, universal serial bus (USB), and optical (e.g., fiber) communication devices. Wireless communication devices include devices that can communicate using radio waves or other electromagnetic energy that can be communicated through the air. Examples of wireless communication devices include Wi-Fi (including a variety of IEEE 802.11 compatible devices) and Bluetooth communication devices. Data communication is typically controlled by the at least one processing device, which operates to perform data communication with other computing devices using the data communication device.

A computing device can also include a variety of other components as will be appreciated by a person of skill in the art.

As discussed above, a computing device typically includes at least some form of computer-readable media. Computer-readable media includes any available media that can be accessed by the computing device. By way of example, computer-readable media includes computer-readable storage devices and computer-readable communication media.

As used herein, computer-readable storage device is limited to physical structures and does not include computer-readable communication media such as transitory signals (and therefore can be referred to as non-transitory computer-readable storage devices). Examples of computer-readable storage devices include volatile and nonvolatile, removable and non-removable media implemented in any device configured to store information such as computer-readable instructions, data structures, program modules or other data. Computer-readable storage media includes, but is not limited to, random access memory, read only memory, electrically erasable programmable read only memory, flash memory or other memory technology, compact disc read only memory, digital versatile disks or other optical storage, magnetic disk storage, or other magnetic storage devices, or any other physical medium that can be used to store the desired information and that can be accessed by the computing device. Computer-readable storage media does not include computer-readable communication media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

Vast potential for accelerating the deployment of effective connected product solutions can be accessed by the encapsulation and single-click deployment of the atomic feature set that allows a product-as-a-service to be deployed by vendors. This allows a decoupled model for connected product solution creation that can eliminate device or product customization & management requirements when subsequently used in multi-various authenticated applications. The ramifications of this innovation on the sustainable growth and spread of device-driven authenticated applications, ecosystem web services, real-world data sets, and physical deployments, where every link in the value chain has an opportunity to contribute, is significant.

It is noted that the abbreviation "PaaS" is sometimes used in the industry as an abbreviation for "Platform-as-a-Service." In contrast, "PaaS" is solely used herein as an abbreviation for the term "Product-as-a-Service."

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A server computing device for associating connected devices with applications comprising:
at least one processing device; and
at least one computer-readable storage device storing data instructions that, when executed by the at least one processing device, cause the server computing device to:
store information associated with a connected device, the information including at least a claim code of the connected device and a group identifier established for the connected device;
receive the claim code of the connected device;
in response to an owner selection of an application at an owner computing device, receive an application identifier of the application at an application programming interface (API) from the owner computing device;
associate the connected device with the application, wherein to associate includes to map the group identifier with the application; and
facilitate interactions between the connected device and the application using the association, the interactions including data communication,
wherein the group identifier is configured to map with at least one additional application to further facilitate interactions between the connected device and the at least one additional application as each additional application identifier of the at least one additional application is received.

2. The server computing device of claim 1, wherein the claim code included within the stored information is one of:
   generated by the server computing device;
   generated by and received from the connected device; or
   generated by and received from a vendor of the connected device.

3. The server computing device of claim 1, wherein the stored information further includes one or more of an identity identifier of the connected device and one or more application identifiers of applications capable of being associated with the connected device.

4. The server computing device of claim 1, wherein the claim code is received from one of a product-as-a-service (PaaS) application or the application to be associated with the connected device.

5. The server computing device of claim 4, wherein the claim code is in a form of a machine-readable code that is scanned by one of the PaaS application, the application to be associated with the connected device, or a code scanning application.

6. The server computing device of claim 5, wherein when the code scanning application scans the claim code, the PaaS application is rendered.

7. The server computing device of claim 4, wherein the claim code is manually entered through one of the PaaS application or the application to be associated with the connected device.

8. The server computing device of claim 1, wherein the at least one processing device is further caused to:
   provide a list of one or more applications capable of being associated with the connected device for display through a product-as-a-service (PaaS) application; and
   wherein the owner selection of the application at the owner computing device is one of a selection of the application from the list or a uniform resource locator (URL) of the application if the application is a new application that is not within the list, wherein the application identifier of the application is received as part of the selection or the URL.

9. The server computing device of claim 1, wherein the at least one processing device is further caused to:
   detect a login created through a product-as-a-service (PaaS) application; and associate the connected device with the login.

10. The server computing device of claim 1, wherein the application identifier is received from a product-as-a-service (PaaS) application, the PaaS application being rendered on the owner computing device; and
    wherein the owner selection includes the owner computing device scanning an application code associated with the application identifier of the application and the PaaS application provides the application identifier in response to the application code of the application being scanned by the owner computing device.

11. The server computing device of claim 10, wherein the owner selection further includes a selection of a link and the server computing device is further caused to generate the application code and the link.

12. The server computing device of claim 1, wherein metadata associated with the application is received in addition to the application identifier, and the server computing device is further caused to:
    provide the metadata to the application to facilitate the interaction between the connected device and the application.

13. The server computing device of claim 1, wherein the server computing device further comprises one or more data structures to store the association, the stored association used to facilitate the interaction between the connected device and the application.

14. The server computing device of claim 13, wherein at least one of the one or more data structures comprises a device information data structure that includes one or more of an identity identifier, the claim code, the group identifier, and a claim context associated with the connected device.

15. The server computing device of claim 14, wherein at least one of the one or more data structures comprises a device routing data structure that includes one or more of the application identifier, an application configuration, and the group identifier.

16. The server computing device of claim 13, wherein at least one of the one or more data structures comprises a device ownership data structure that includes an owner identifier and associates the owner identifier with the connected device.

17. The server computing device of claim 1, wherein the connected device is one of:
    an IP capable device;
    a non-IP device or a local IP capable device coupled to an IP capable gateway;
    a non-IP device coupled to a non-IP gateway, wherein the non-IP gateway couples the non-IP device to the IP capable gateway.

18. The server computing device of claim 1, wherein the owner computing device executes at least one of the product-as-a-service (PaaS) application and the application.

19. The server computing device of claim 1, wherein the owner selection includes a selection of a link that claims the connected device within the application executing on the owner computing device.

20. The server computing device of claim 19, wherein in response to the selection of the link a PaaS application is executed on the owner computing device and the PaaS application provides the application identifier to the server computing device.

21. A method for associating connected devices with applications comprising:
    storing information associated with a connected device at a server computing device, the information including at least a claim code of the connected device and a group identifier established for the connected device;
    receiving, at the server, the claim code of the connected device;
    in response to an owner selection of an application at an owner computing device, receiving, at the server, an application identifier of the application at an application programming interface (API) from the owner computing device;
    associating, at the server, the connected device with the application by mapping the group identifier with the application; and
    facilitating, at the server, interactions between the connected device and the application using the association, the interactions including data communication,
    wherein the group identifier is configured to map with at least one additional application to further facilitate interactions between the connected device and the at least one additional application in response to receiving each additional application identifier of the at least one additional application.

22. The method of claim 21, wherein receiving the claim code comprises:
  receiving the claim code from one of a product-as-a-service (PaaS) application or the application to be associated with the connected device.

23. The method of claim 22, wherein receiving the application identifier comprises:
  receiving the application identifier from one of the PaaS application or the application to be associated with the connected device.

24. The method of claim 22, further comprising:
  providing a list of one or more applications capable of being associated with the connected device for display through the PaaS application; and
  wherein the owner selection of the application at the owner computing device is one of a selection of the application from the list or a uniform resource locator (URL) of the application if the application is a new application that is not within the list, wherein the application identifier of the application is received as part of the selection or the URL.

25. The method of claim 22, further comprising
  detecting a login created through the PaaS application; and
  associating the connected device with the login.

26. The method of claim 22, further comprising:
  receiving the application identifier from the PaaS application in response to an application code being scanned by an owner computing device, the scanning of the application code causing the PaaS application to render on the owner computing device and provide the application identifier, wherein the application identifier is associated with the application code.

27. The method of claim 22, further comprising:
  receiving the application identifier from the PaaS application in response to the owner selection of a link to claim connected devices within the application that is executing on an owner computing device, the owner selection causing the PaaS application to be rendered on the owner computing device and provide the application identifier, wherein the application identifier is associated with the link.

28. The method of claim 21, further comprising:
  storing the association within one or more data structures; and
  using the stored association to facilitate the interaction between the connected device and the application using the association.

* * * * *